US011214906B2

(12) United States Patent
Li et al.

(10) Patent No.: US 11,214,906 B2
(45) Date of Patent: Jan. 4, 2022

(54) WASHING MACHINE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Yimin Li, Shandong (CN); Chunfeng Lao, Shandong (CN); Xinghui Hao, Shandong (CN); Di Wu, Shandong (CN); Peishi Lv, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 18 days.

(21) Appl. No.: 16/642,057

(22) PCT Filed: Aug. 30, 2018

(86) PCT No.: PCT/CN2018/103155
§ 371 (c)(1),
(2) Date: Feb. 26, 2020

(87) PCT Pub. No.: WO2019/042343
PCT Pub. Date: Mar. 7, 2019

(65) Prior Publication Data
US 2021/0071343 A1 Mar. 11, 2021

(30) Foreign Application Priority Data
Aug. 31, 2017 (CN) .......................... 201710774775.8

(51) Int. Cl.
*D06F 23/02* (2006.01)
*D06F 37/06* (2006.01)
(Continued)

(52) U.S. Cl.
CPC ............ *D06F 23/025* (2013.01); *D06F 23/02* (2013.01); *D06F 37/06* (2013.01); *D06F 39/08* (2013.01);
(Continued)

(58) Field of Classification Search
CPC ........ D06F 39/083; D06F 23/02; D06F 37/06; D06F 37/22; D06F 39/08; D06F 23/025; D06F 37/04; F16K 15/025
See application file for complete search history.

(56) References Cited

U.S. PATENT DOCUMENTS

| 8,336,338 | B2 | 12/2012 | Cimetta et al. |
| 2013/0036774 | A1 | 2/2013 | Kim et al. |
| 2015/0027173 | A1 | 1/2015 | Wu et al. |

FOREIGN PATENT DOCUMENTS

| CN | 101400842 A | 4/2009 |
| CN | 101705598 A | 5/2010 |

(Continued)

OTHER PUBLICATIONS

International Search Report (PCT/ISA/210), with translation, and Written Opinion (PCT/ISA/237) dated Oct. 31, 2018, by the Chinese Patent Office as the International Searching Authority for International Application No. PCT/CN2018/103155.
(Continued)

*Primary Examiner* — Michael E Barr
*Assistant Examiner* — Pallavi Chitta
(74) *Attorney, Agent, or Firm* — Buchanan Ingersoll & Rooney PC

(57) ABSTRACT

An inner drum of a washing machine has a plurality of hollow lifting ribs arranged on the side wall of the drum that communicate with the interior of the drum. At least one drainage port communicating with the hollow portions of the lifting ribs is formed in the side wall of the drum. A sealing
(Continued)

valve is located inside each lifting rib at each drainage port. During high-speed rotation of the drum, valve bodies of the sealing valves move along a radial center direction of the drum under a centrifugal force, to open the drainage ports. Through this arrangement, discharging water flow in the drum to the outside from the hidden drainage ports is achieved. Meanwhile, centrifugal force during the high-speed rotation of the drum is used to control valve cores of the sealing valves such that the drainage ports are automatically opened for drainage from the drum.

14 Claims, 15 Drawing Sheets

(51) Int. Cl.
    *D06F 39/08*     (2006.01)
    *F16K 15/02*     (2006.01)
(52) U.S. Cl.
    CPC .......... *D06F 39/083* (2013.01); *F16K 15/025* (2013.01)

(56) References Cited

FOREIGN PATENT DOCUMENTS

| CN | 202543632 U | | 11/2012 |
|---|---|---|---|
| CN | 102953257 A | | 3/2013 |
| CN | 204112106 U | | 1/2015 |
| CN | 205688223 U | * | 11/2016 |
| CN | 106436194 A | | 2/2017 |
| EP | 3138946 A1 | | 3/2017 |
| WO | 02/04734 A1 | | 1/2002 |
| WO | 2013167917 A1 | | 11/2013 |

OTHER PUBLICATIONS

The extended European search report dated Jul. 6, 2020, by the European Patent Office in corresponding European Patent Application No. 18850129.0. (5 pages).

* cited by examiner

WASHING MACHINE

TECHNICAL FIELD

The present disclosure belongs to the technical field of washing machines, and more particularly relates to a washing machine only provided with a rotatable inner drum capable of holding water.

BACKGROUND

In the prior art, a drum washing machine generally includes an inner drum and an outer drum that are set together. The outer drum is sealed for holding water, and the inner drum is used to hold clothes. The inner drum is rotated to beat and wash the clothes. Meanwhile, dewatering holes are formed in the inner drum, so that the water in the outer drum flows into the inner drum through the dewatering holes to soak the clothes in the inner drum, and the water in the inner drum flows out to the outer drum through the dewatering holes. The water in the clothes in the inner drum is discharged to the outer drum through the dewatering holes during the high-speed rotation of the inner drum to achieve the objective of washing the clothes.

However, since the inner drum and the outer drum are set together, dirt is easily gathered between the inner and outer drums during the use of the washing machine. Moreover, since the inner and outer drums are set together, a user cannot clean the outer wall of the inner drum and the inner wall of the outer drum, so that bacteria inside the washing machine are increased, and the washing efficiency of the washing machine and the cleanliness of washed laundry are reduced.

Meanwhile, in the existing washing machine, since the inner drum is covered with the outer drum, the washing process of the washing machine is to beat and wash the clothes by rotating the inner drum, so that the washing capacity of the washing machine is based on the inner drum. Therefore, the usage rate of an inner space of the washing machine is relatively low, and it is not possible to expand the washing capacity of the washing machine on the existing basis.

In view of this, how to set a washing machine to integrate inner and outer drums becomes a research and development hotspot. In this washing machine, the inner drum is designed as a sealed container that can hold the water and the clothes and can also be rotated to beat the clothes for washing. In addition, the washing machine is provided with no outer drum, or the outer drum and a washing machine housing are integrated, so that the inner drum of the washing machine can also be expanded to extend the washing capacity of the washing machine.

However, since the inner drum not only is used to hold the washing water, but also is rotated to beat and wash the clothes in the drum, how to set a dewatering structure and a drainage structure suitable for the above-mentioned washing machine has become a problem needing to be solved urgently.

In view of the above technical defects, this application is hereby provided.

SUMMARY

The objective of the present disclosure is to overcome the above defects in the prior art to provide a washing machine. According to a dewatering structure of the washing machine of the present disclosure, drainage ports are formed in an inner drum, and sealing valves are arranged at the drainage ports. The sealing valves are set to be opened by a centrifugal force caused by the high-speed rotation of the inner drum to enable water separated from clothes in the inner drum to be discharged when the inner drum is in a high-speed rotating state and when the washing machine executes a dewatering program, so as to solve the problem of discharging of the washing water in the inner drum in the dewatering program of the washing machine.

In order to solve the technical problem and achieve the technical effect, the basic design concept of the technical solution adopted in the present disclosure is as follows. A washing machine, the inner drum of the washing machine is an enclosed container after an opening is fastened by a door cover. A plurality of lifting ribs are arranged on a side wall of the inner drum. The lifting ribs are hollow inside and communicate with an interior of the inner drum. At least one drainage port communicating with hollow portions of the lifting ribs is formed in the side wall of the inner drum. The sealing valves located inside the lifting ribs are arranged at the drainage ports. During the high-speed rotation of the inner drum, valve bodies of the sealing valves move along a radial center direction of the inner drum under the action of the centrifugal force, so as to open the drainage ports formed in the side wall of the inner drum.

Further, the lifting ribs are hollow inside. A circle of gap is formed in a joint of a bottom portion of each lifting rib and the side wall of the inner drum and the circle of gap constitutes a water flow passage enabling the hollow portion inside the lifting rib to communicate with the interior of the inner drum.

Further, at least one drainage port is formed in a position, corresponding to the hollow portions of the lifting ribs, of the side wall of the inner drum and enables the hollow portions of the lifting ribs to communicate with the outside, so as to discharge washing water flowing into the hollow portions of the lifting ribs through the drainage ports.

Further, the sealing valves each include the valve body and a balancing weight. The valve body and balancing weight are fixedly connected with two ends of supporting rod, respectively. Middle portion of the supporting rod is in supporting contact with the inner drum, so that the balancing weight moves up and down along a radial direction of the inner drum under the action of the centrifugal force during the high-speed rotation of the inner drum. The valve body is prized by the supporting rods to generate displacement opposite to a motion direction of the balancing weight along the radial direction of the inner drum.

Further, the supporting rods each include a first rod portion and a second rod portion which are arranged in a staggered manner. Joint of the first rod portion and the second rod portion is lower than the two ends of the supporting rods, and the joint is in supporting contact with the inner drum, so that the valve body and the balancing weight at the two ends of the supporting rod rotatably move up and down around the joint.

Further, end portion of the first rod portion is hinged with the valve body, and end portion of the second rod portion is fixedly connected with the balancing weight. The axial length of the first rod portion is less than the axial length of the second rod portion.

Further, the hollow portion of each lifting rib is provided with a mounting seat fixed to the side wall of the inner drum. The valve body of the sealing valve can be mounted on the mounting seat in a manner of moving along the radial direction of the inner drum. One end of the valve body penetrates out of the mounting seat and is connected with end portion of the supporting rod, and the other end of the valve body is arranged corresponding to the drainage port formed in the side wall of the inner drum.

Further, the mounting seat is a tapered body arranged correspondingly coaxial with the drainage port. The tapered body is hollow inside to mount the valve body. Upper end of the valve body penetrates out from top portion of the tapered body and is hinged with the supporting rod, and lower end of the valve body is provided with plug for correspondingly sealing the drainage port.

Preferably, a diameter of opening in the top portion of the tapered body is less than a diameter of a periphery of the plug, so as to avoid the plug from falling off from the mounting seat.

Further preferably, joint of the supporting rod is in limiting contact with the top portion of the tapered body, so that contact position of the supporting rod and top surface of the tapered body is used as supporting point to enable the balancing weight at the end portion of the supporting rod to move up and down around the supporting point.

Further, the valve body of the sealing valve and/or the supporting rod are connected with the inner drum through elastic recovery member, so as to apply an elastic force to the valve body and to push the valve body to close the corresponding drainage port. Furthermore, the centrifugal force counteracts the elastic force of the elastic recovery member during the high-speed rotation of the inner drum to enable the valve body to move and open the drainage port.

Preferably, the elastic recovery member is a spring. The spring is arranged at the periphery of the valve body in a sleeving manner and extends along the radial direction of the inner drum. Two ends of the spring are respectively in limiting contact with the plug of the valve body and top end of the mounting seat, so that the spring is clamped between the valve body and the mounting seat.

Further, the lifting rib extends along an axial direction of the inner drum. Each of the front and rear ends of the hollow portion of the lifting rib is provided with at least one drainage port. Each sealing valve is correspondingly mounted at each drainage port. The balancing weights of the two sealing valves are both deviated towards the center direction of the inner drum relative to the corresponding drainage ports.

Compared with a washing machine in the prior art, the washing machine of the present disclosure has the following beneficial effects.

Through the above arrangement, the objective of discharging the water flow in the inner drum from the hidden drainage ports is achieved by hiding the drainage ports inside the lifting ribs of the inner drum. Meanwhile, the sealing valves are arranged at the drainage ports to realize that the centrifugal force during the high-speed rotation of the inner drum is used to correspondingly control valve cores of the sealing valves, so as to correspondingly open and close the drainage ports, thus achieving the objective that the drainage ports are automatically opened to correspondingly discharge the water in the inner drum after the centrifugal force of the high-speed rotation of the inner drum acts on the valve cores of the sealing valves when the washing machine executes a dewatering program.

In addition, the inner drum is designed as the sealed container for washing after being fastened by the door cover, so that the clothes is only in contact with the washing water in the sealed inner drum in the washing process, thus avoiding the occurrence of the phenomenon that the washing water between inner and outer drums flows into the inner drum and pollutes the clothes, greatly improving the washing cleanness of the washing machine, and avoiding the occurrence of the phenomenon that the washing machine cannot thoroughly wash the clothes due to the pollution caused by the washing water between the inner and outer drums.

Meanwhile, the present disclosure is simple in structure, outstanding in effect and suitable for being popularized and used.

In order to make the design concept of the technical solution of the present disclosure clearer and facilitate further understandings of the beneficial effects of the present disclosure, partial specific implementation modes of the present disclosure are described in detail below in combination with the accompanying drawings.

BRIEF DESCRIPTION OF THE DRAWINGS

The drawings constitute a part of the present disclosure and are used to provide a further understanding of the present disclosure. Illustrative embodiments and descriptions thereof of the present disclosure are used to explain the present disclosure, and do not constitute an improper limitation to the present disclosure. Obviously, the drawings described below are only some embodiments, and those skilled in the art can obtain other drawings according to these drawings without paying any creative work. In the drawings.

Figure 1:
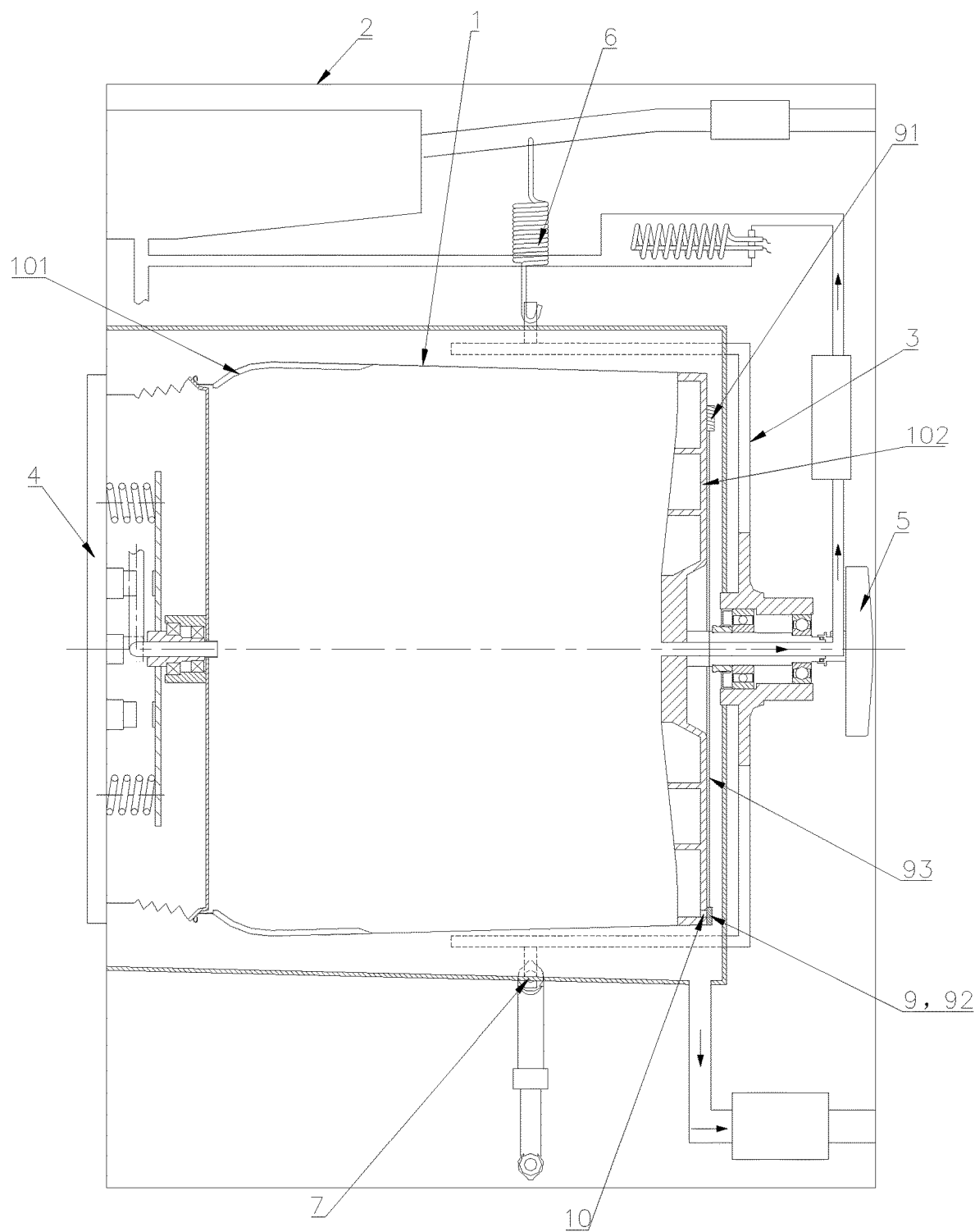
FIG. 1 is a structural schematic diagram of a washing machine in Embodiment I of the present disclosure.

Numbers in the drawings: 1: inner drum; 2: housing; 3: inner drum supporting member; 4: door cover; 5: driving motor; 6: vibration absorption hanging spring; 7: vibration absorption supporting member; 8: lifting rib; 9: sealing valve; 10: drainage port; 11: control valve; 12: convex rib; 90: limiting cavity; 91: balancing weight; 92: valve body; 93: connection rod; 94: supporting rod; 95: first connection rod; 96: second connection rod; 97: mounting seat; 98: limiting slot; 99: center portion; 910: protruding rib; 911: spring; 921: plug; 941: first rod portion; 942: second rod portion; 81: baffle plate; 82: first cavity; 83: second cavity; 101: inner drum opening; and 102: inner drum bottom.

It should be noted that these drawings and text descriptions are not intended to limit the conceptual scope of the present disclosure in any form but are to describe the concept of the present disclosure to those skilled in the art with reference to specific embodiments.

DETAILED DESCRIPTION

In order to make the objectives, technical solutions and advantages of the embodiments of the present disclosure clearer, the technical solutions in the embodiments will be described clearly and completely below in conjunction with the drawings in the embodiments of the present disclosure. The following embodiments are used to describe the present disclosure, but not intended to limit the scope of the present disclosure.

In the description of the present disclosure, it should be noted that orientations or positional relationships indicated by the terms "upper", "lower", "front", "rear", "left", "right", "vertical", "inside", "outside" and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms cannot be construed as limiting the present disclosure.

In the description of the present disclosure, it should be noted that unless otherwise explicitly defined and defined, the terms "installed", "connected" and "coupled" are to be understood broadly, and may be, for example, fixedly connected, or detachably connected, or integrally connected, or mechanically connected, or electrically connected, or directly connected, or indirectly connected through an intermediate medium. Those of ordinary skill in the art can understand the specific meanings of the above terms in the present disclosure according to specific situations.

Figure 2:
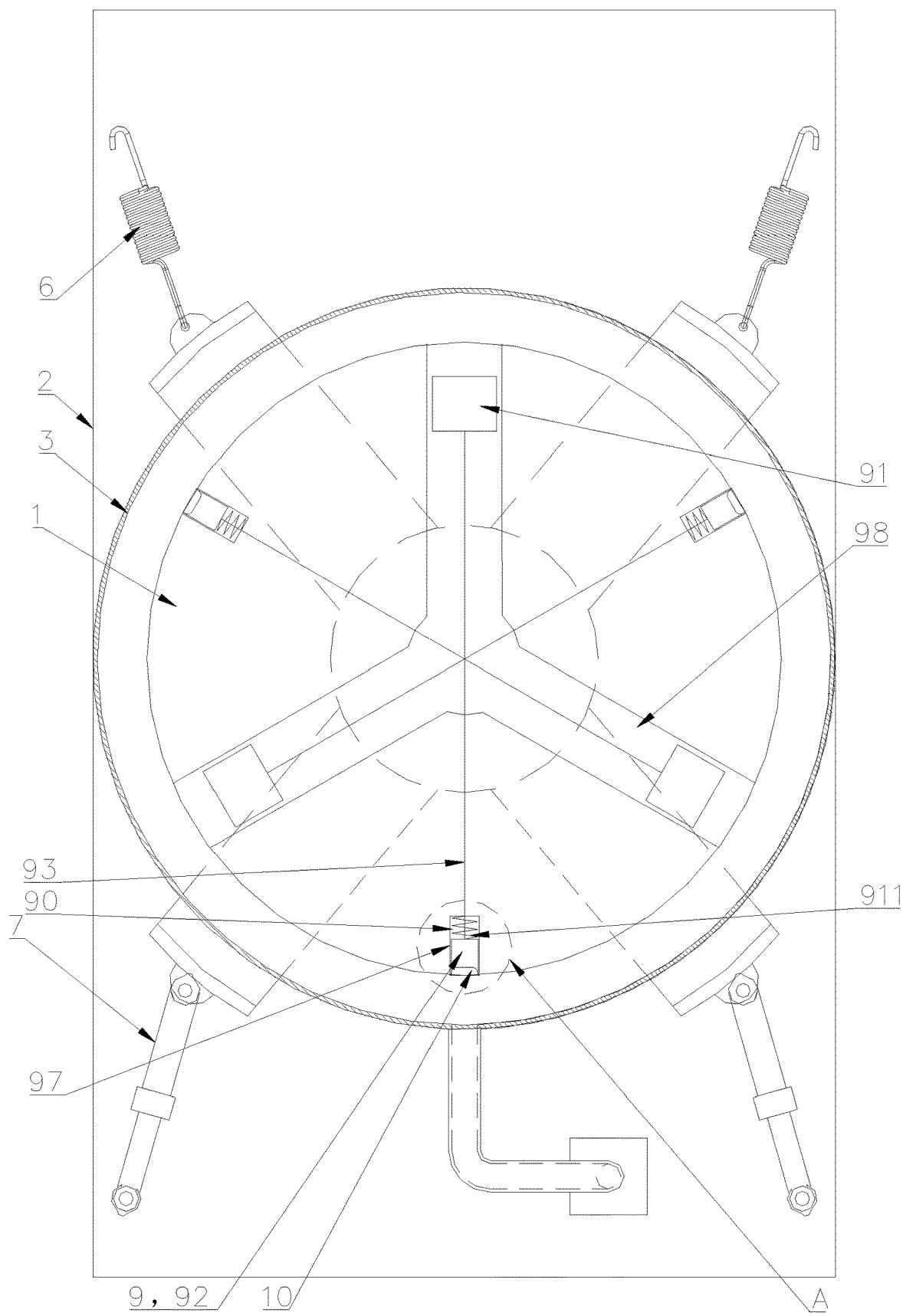
FIG. 2 is a rear-view structural schematic diagram of the washing machine in Embodiment I of the present disclosure.

As shown in FIG. 1 to FIG. 2, the embodiment of the present disclosure discloses a washing machine, including a housing 2. An inner drum 1 is arranged in the housing 2. The axial line of the inner drum 1 horizontally extends or is gradually downwards inclined from front to back. The front end of the inner drum 1 is an opened inner drum opening 101, and the rear end of the inner drum is a sealed inner drum bottom 102. No through hole is formed in the drum wall of the inner drum 1, so that a sealed container only with an opening in the front portion is formed inside the inner drum 1. Meanwhile, a door cover 4 capable of being opened towards the outside is mounted at the front end of the washing machine housing 2, so as to achieve the objectives of closing the inner drum opening 101 after the door cover 4 is closed and throwing clothes into the inner drum 1 through the inner drum opening 101 after the door cover 4 is opened. The rear end of the inner drum 1 is mounted in the washing machine housing 2 through an inner drum supporting member 3. The inner drum supporting member 3 is coaxial with the rear end of the inner drum 1. The upper and lower ends of the inner drum supporting member 3 are bent towards the drum opening in the front end of the inner drum 1, and the bent portions at least extend to the middle portion of the inner drum 1. The upper and lower bent portions are respectively connected with the washing machine housing 2 through vibration absorption hanging springs 6 and vibration absorption supporting rods 7, so as to achieve the objective that the inner drum supporting member 3 is mounted in the washing machine housing 2 in a vibrating manner. Meanwhile, the center of the inner drum bottom 102 and a motor shaft of a driving motor 5 of the washing machine are coaxially arranged to drive the inner drum 1 to rotate. The inner drum 1 and the driving motor 5 are both fixedly mounted on the inner drum supporting member 3. Preferably, the inner drum bottom 102 and the driving motor 5 are respectively arranged on two sides of the inner drum supporting member 3. The driving motor 5 is fixedly connected with the inner drum supporting member 3. The motor shaft of the driving motor 5 passes through the inner drum supporting member 3 through a bearing and is coaxially fixedly connected with the inner drum bottom 102. A shaft of the driving motor 5 may rotate relative to the inner drum supporting member 3, so as to achieve the objectives of mounting the inner drum 1 and the driving motor 5 on the inner drum supporting member 3 and enabling the inner drum 1 to independently rotate under the action of the driving motor 5 to wash the clothes inside.

Figure 8:
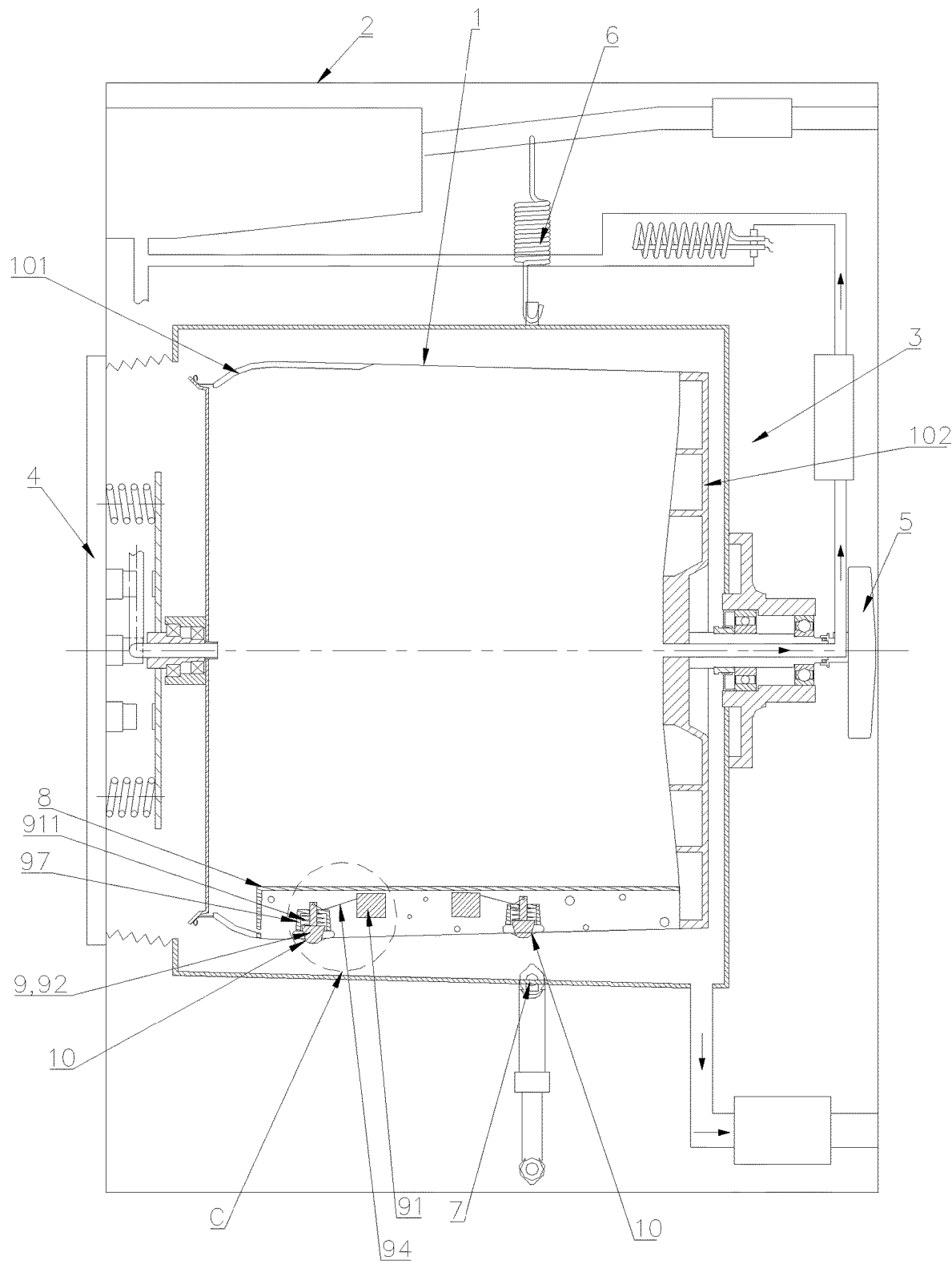
FIG. 8 is a structural schematic diagram of a washing machine in Embodiment III of the present disclosure.

In addition, the washing machine in the embodiment of the present disclosure may be any washing machine having a sealed container formed inside the inner drum after a door cover closes the inner drum opening, so that the inner drum is controlled to rotate at a high speed when the washing machine executes a dewatering program to successfully discharge a water flow, separated from the clothes in the inner drum, out of the inner drum, thus achieving the objective of normal execution of the dewatering program by the washing machine with a holeless inner drum. Therefore, the washing machine in the embodiment of the present disclosure is not limited to the structure in the drawing. For example, it may also be as shown in FIG. 8. By the adoption of an existing common washing machine, it is only necessary to design the inner drum 1 of the washing machine into the sealed container which has no dewatering hole and is formed after the door cover 4 closes the inner drum opening 101.

Meanwhile, the inner drum is designed as the sealed container for washing after being fastened by the door cover, so that the clothes are only in contact with the washing water in the sealed inner drum in the washing process, thus avoiding the occurrence of the phenomenon that the washing water between inner and outer drums flows into the inner drum and pollutes the clothes, greatly improving the washing cleanness of the washing machine, and avoiding the occurrence of the phenomenon that the washing machine cannot thoroughly wash the clothes due to the pollution caused by the washing water between the inner and outer drums.

Embodiment I

In the embodiment of the present disclosure, in order to discharge water flow separated from clothes in an inner drum 1 of a washing machine and realize that the inner drum 1 is sealed to hold water for normal washing during working of the washing machine, the following settings are carried out:

As shown in FIG. 1 to FIG. 4, the present embodiment discloses the washing machine. The inner drum 1 of the washing machine is an enclosed container after an inner drum opening 101 is fastened by a door cover 4. An inner drum bottom 102 is provided with at least one drainage port 10. A sealing valve 9 which moves to be opened and closed along a radial direction of the inner drum bottom 102 is arranged at each drainage port 10. During the high-speed rotation of the inner drum 1, valve bodies 92 of the sealing valves 9 move along the radial direction of the inner drum bottom 102 towards a center direction under the action of a centrifugal force, so as to open the drainage ports 10 formed in the inner drum bottom 102.

In the present embodiment, the plurality of drainage ports 10 disposed at an equal spacing angle are formed in the periphery of the inner drum bottom 102. Each drainage port 10 is correspondingly provided with one sealing valve 9. The valve bodies 92 of the sealing valves 9 move along the radial direction of the inner drum bottom 102 by the centrifugal force of the high-speed rotation of the inner drum 1 under the action of limiting structures, so as to correspondingly open the drainage ports 10. Preferably, the various drainage ports 10 are symmetrically disposed relative to the center of the inner drum bottom 102, so that the gravity center of the inner drum bottom 102 is located in the center to prevent the inner drum 1 from being off the center.

In the present embodiment, each sealing valve 9 includes the valve body 92 connected with a balancing weight 91 through a connection rod. The connection rods 93 and the balancing weights 91 are arranged on two opposite sides of the center of the inner drum bottom 102. During the high-speed rotation of the inner drum 1, the balancing weights 91 move towards the outside along the radial direction of the inner drum bottom 102 under the action of the centrifugal force and pull the valve bodies 92 through the connection rods 93 to move towards the center direction of the inner drum bottom 102, so as to open the corresponding drainage ports 10. Since the sealing valves 9 are arranged on the inner drum bottom 102 of the washing machine, the centrifugal force acts on the balancing weights 91 during the high-speed rotation of the inner drum 1 to enable the balancing weights 91 to move towards the peripheral direction of the inner drum 1 to pull the valve bodies 92 on the opposite sides to move towards the center direction of the inner drum bottom 102, thus achieving the objective of opening the drainage ports 10 formed in the inner drum bottom 102 by using the centrifugal force during the high-speed rotation of the inner drum 1.

Preferably, the weight of the balancing weights 91 is greater than the weight of the valve bodies 92, so that the action direction of the centrifugal force on connected structures of the balancing weights 91 and the valve bodies 92 is the valve bodies 92 moving towards the center direction of the inner drum bottom 102. Further preferably, in order to enhance the action of the centrifugal force, the weight of the balancing weights 91 is greater than twice of the weight of the valve bodies 92, so as to enable the valve bodies 92 to reliably move towards the center direction of the inner drum bottom 102 under the action of the centrifugal force to overcome the influence of the balancing weights 91 and a friction force.

In the present embodiment, the connection rods pass through the center of the inner drum bottom 102 and extend along the radial direction of the inner drum bottom 102. The two ends of the connection rods 93 are fixedly connected with the balancing weights 91 and the valve bodies 92 of the sealing valves 9, respectively. The balancing weights 91 and the valve bodies 92 of the sealing valves 9 are respectively arranged on two opposite sides relative to the center of the inner drum bottom 102, so as to enable the balancing weights 91 and the valve bodies 92 to respectively generate displacement in opposite directions under the action of the centrifugal force. However, since the weight of the balancing weights 91 is greater than the weight of the valve bodies 92, the balancing weights 91 pull the valve bodies 92 through the connection rods to move together towards the center direction of the inner drum bottom 102, so as to enable the valve bodies 92 to open the drainage ports 10 under the action of the centrifugal force during the high-speed rotation of the inner drum 1. Furthermore, the various drainage ports 10 are close to the periphery of the inner drum bottom 102, so that the water flow flowing along the side wall of the inner drum 1 is discharged through the drainage ports 10 formed in the periphery of the inner drum bottom 102 during dewatering of the washing machine. Therefore, all the separated water flow in the dewatering program of the washing machine is discharged to avoid retention of the water flow in the inner drum 1.

In the present embodiment, the sealing valves 9 are fixedly connected with the inner drum bottom 102 to rotate together with the inner drum 1. By fixedly connecting the sealing valves 9 with the inner drum bottom 102, the valve bodies 92 of the sealing valves 9 and the balancing weights 91 both rotate at the high speed together with the inner drum 1 when the washing machine executes the dewatering program, thus ensuring that the valve bodies 92 correspondingly open the drainage ports 10 formed in the inner drum bottom 102 under the action of the centrifugal force.

In the present embodiment, mounting seats 97 for mounting the valve bodies 92 are arranged on the inner drum bottom 102, and the mounting seats include limiting cavities extending along the radial direction of the inner drum bottom 102. The valve bodies 92 can be arranged in the limiting cavities in a manner of moving along the radial direction of the inner drum bottom 102. The drainage ports 10 are formed in the ends, close to the periphery of the inner drum bottom 102, of the limiting cavities. Through the above arrangement, valve cores move in the limiting cavities formed in the inner drum bottom. The valve cores can only generate extending and retracting displacement along the radial direction of the inner drum by the influence of the limiting cavities, thus ensuring extending and retracting movement of the valve cores along the radial direction of the inner drum under the action of the centrifugal force during the high-speed rotation of the inner drum to correspondingly open or close the drainage ports in the end portions of the limiting cavities.

In the present embodiment, the valve bodies 92 of the sealing valves 9 are connected with the inner drum bottom 102 through elastic recovery members, so as to apply an elastic force to the valve bodies 92 and push the valve bodies 92 to close the corresponding drainage ports 10. Furthermore, the centrifugal force counteracts the elastic force of the elastic recovery members during the high-speed rotation of the inner drum 1 to enable the valve bodies 92 to move and open the drainage ports 10. Through the arrangement of the elastic recovery members on the sealing valves 9, the valve bodies 91 are ensured to be at their initial closed positions to enable the valve bodies 92 to block the drainage ports 10. Meanwhile, after the sealing valves 9 are opened under the action of the centrifugal force, when the washing machine stops the execution of the dewatering program, the valve bodies 92 are reset to the initial closed position under the pulling action of the elastic recovery members to enable the valve bodies 92 to block the drainage ports 10, so as to ensure that the inner drum 1 is an enclosed container when the washing machine executes a washing program and a rinsing program to avoid the phenomenon of outflow of washing water or rinsing water.

In the present embodiment, the elastic recovery members are springs 911. One end of each spring 911 is connected with the corresponding valve body 92, and the other end of each spring 911 is fixed with the end, close to the center of the inner drum bottom 102, of the corresponding mounting seat 97 arranged on the inner drum bottom 102. It is set that under the action of a pulling force of the springs 911, the valve bodies 92 limit the springs 911 to move outwards along the radial direction of the mounting seats 97 to realize that a reset force is provided to the valve bodies 92 pulled by the springs 911.

Figure 3:
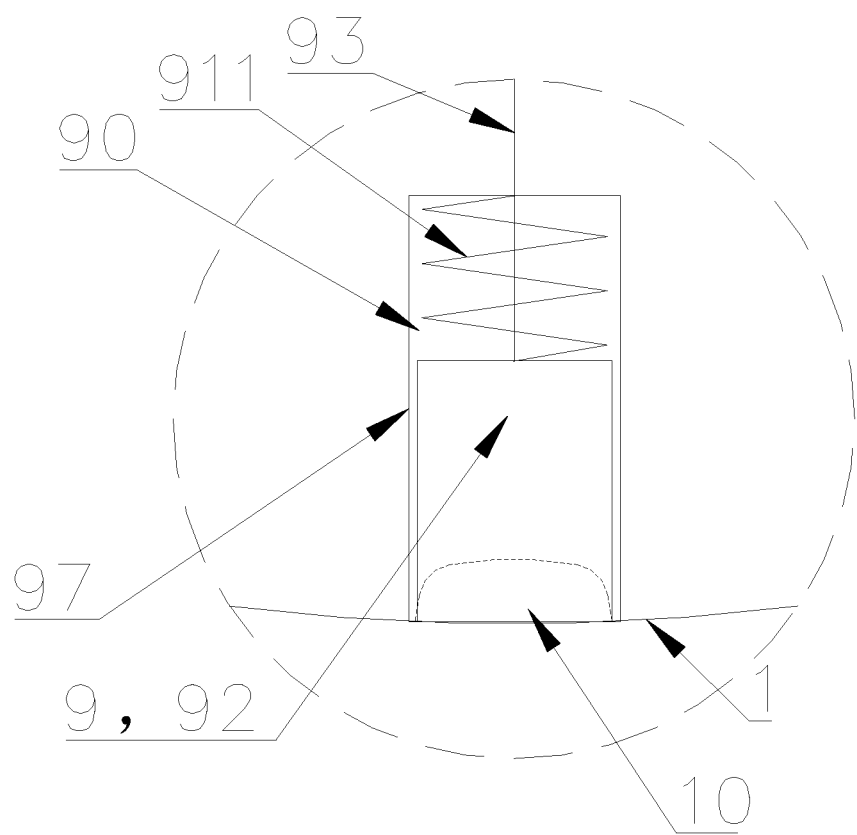
FIG. 3 is an enlarged structural schematic diagram of a closed state of a sealing valve at the position A in FIG. 2.
Figure 4:
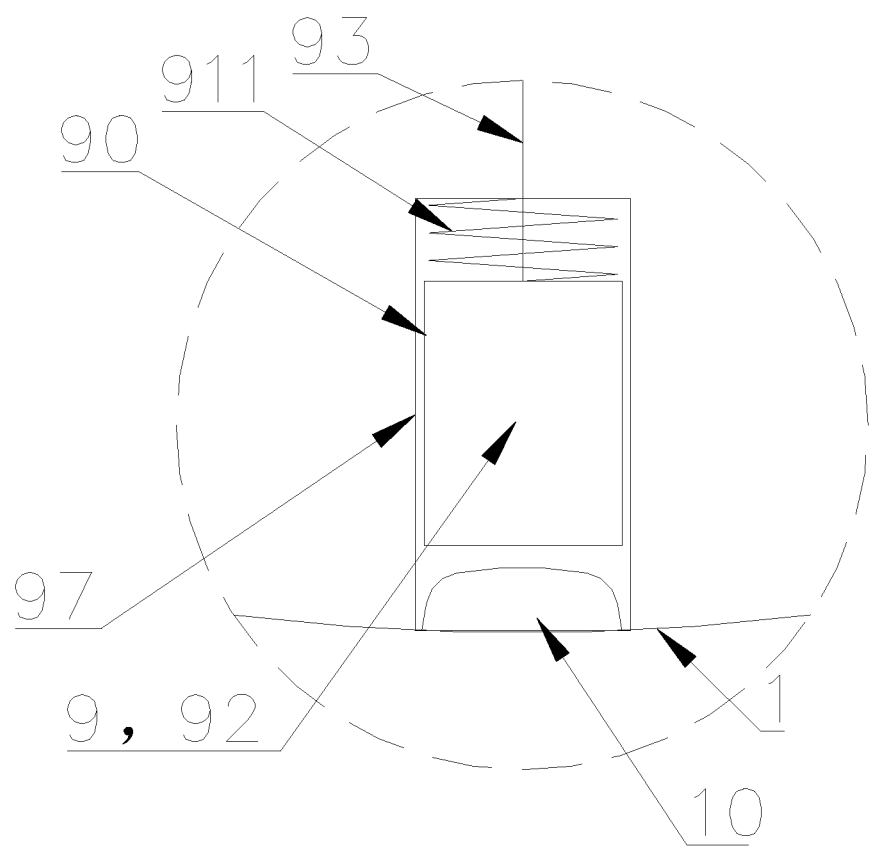
FIG. 4 is an enlarged structural schematic diagram of an open state of the sealing valve at the position A in FIG. 2.

In the present embodiment, as shown in FIG. 4, when the washing machine is in a dewatering state, the inner drum 1 is in a high-speed rotation state, and the balancing weights 91 move towards the periphery of the inner drum 1 under the action of the centrifugal force and provide the pulling force to the valve bodies 92 to move towards the center direction of the inner drum 1. The centrifugal force of the balancing weights 91 on the valve bodies 92 counteracts the elastic force of the springs 911, so that the valve bodies 92 move towards the center direction of the inner drum bottom 102 to open the sealing valves. As shown in FIG. 3, when the washing machine is not in a dewatering state, the inner drum 1 is not in the high-speed rotation state, and the balancing weights 91 are no longer stressed by the centrifugal force. The springs 911 are in a pressed state and apply a pushing force that is towards the peripheral direction of the inner drum bottom 102 to the valve bodies 92, so that the valve bodies 92 move towards the peripheral direction of the inner drum bottom 102 until the sealing valves are closed. In addition, when the inner drum 1 is in the washing or rinsing program, the springs 911 keep providing the elastic force for the valve bodies 92 to ensure that the valve bodies 92 block the drainage ports 10 all the time, and then ensure that the drainage ports 10 in the inner drum bottom 102 are in the closed state all the time.

In the present embodiment, the inner drum bottom 102 is provided with limiting slots 98 for limiting the balancing weights 91 to move. The limiting slots 98 extend along the radial direction of the inner drum bottom 102. The balancing weights 91 are mounted in the corresponding limiting slots of the inner drum bottom 102, so that the balancing weights 91 are driven to move along the axial direction of the limiting slots during the high-speed rotation of the inner drum 1 and are pulled to open the drainage ports 10. Through the formation of the limiting slots in the inner drum bottom, the balancing weights are ensured to move along the radial direction of the inner drum bottom all the time, and the moving directions of the balancing weights would not be deviated, thus achieving the objective that the balancing weights pull the valve bodies to correspondingly open or close the drainage ports when moving along the radial direction of the inner drum under the action of the centrifugal force.

In the present embodiment, the plurality of limiting slots 98 and the plurality of drainage ports 10 are formed in the inner drum bottom 102 in a staggered manner. Each drainage port 10 and one limiting slot are correspondingly formed in two opposite sides of the center of the inner drum bottom 102 and extend along the same diameter of the inner drum bottom 102. The sealing valves 9 and the balancing weights 91 are respectively arranged at the drainage ports 10 and the limiting slots 98 in the two opposite sides. The connection rods extending along the corresponding diameter of the inner drum bottom 102 connect the valve bodies 92 of the sealing valves 9 with the balancing weights 91, so that the balancing weights 91 move towards the peripheral direction of the inner drum bottom 102 by the centrifugal force during the high-speed rotation of the inner drum 1, and pull the valve bodies 92 on the opposite sides through the connection rods to move towards the center direction of the inner drum bottom 102 to open the drainage ports 10. Through the uniform distribution of the plurality of drainage ports 10 in the periphery of the inner drum bottom 102, the water separated from the clothes in the inner drum 1 is completely discharged, so that no water will be maintained in the inner drum 1, and the separated water discharging reliability of the inner drum 1 is improved.

Embodiment II

Figure 5:
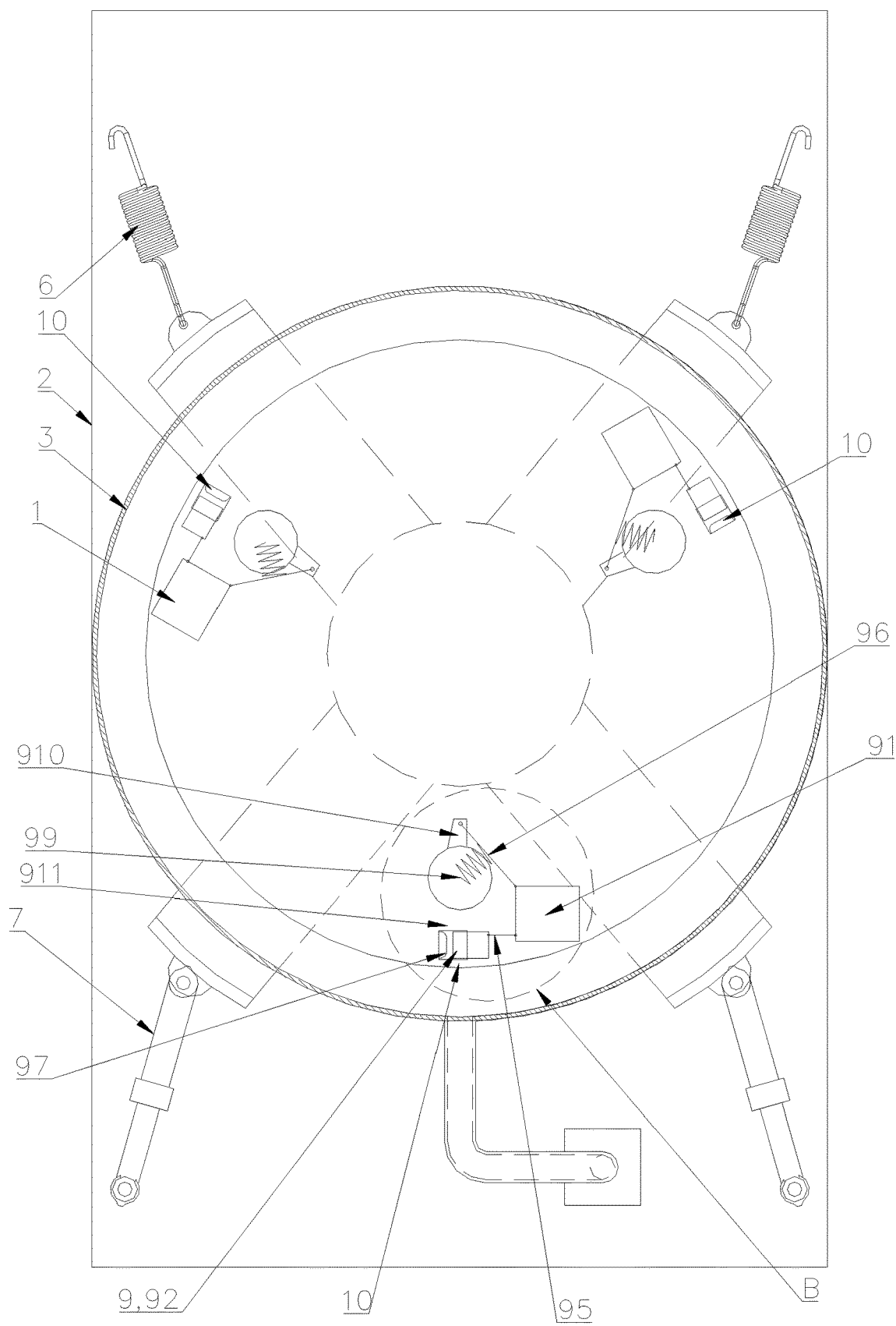
FIG. 5 is a rear-view structural schematic diagram of a washing machine in Embodiment II of the present disclosure.
Figure 6:
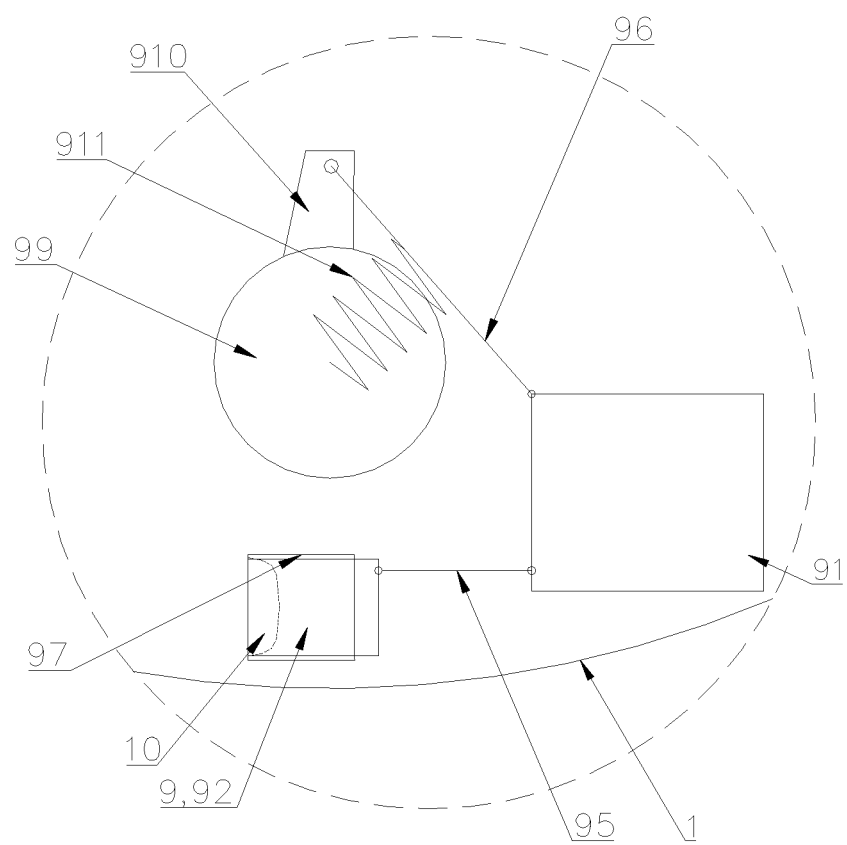
FIG. 6 is an enlarged structural schematic diagram of a closed state of a sealing valve at the position B in FIG. 5.
Figure 7:
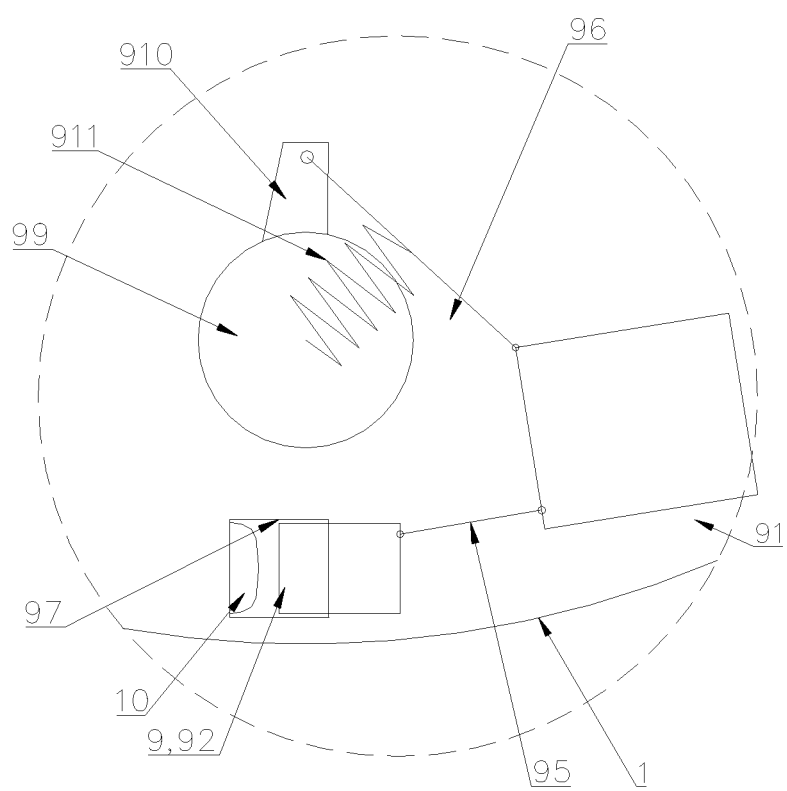
FIG. 7 is an enlarged structural schematic diagram of an open state of the sealing valve at the position B in FIG. 5.

In the embodiment of the present disclosure, in order to discharge water flow separated from clothes in inner drums 1 of a washing machine and realize that the inner drums 1 are sealed to hold water for normal washing during working of the washing machine, the following settings are carried out:

As shown in FIG. 5 to FIG. 7, the present embodiment discloses the washing machine. Inner drum 1 of the washing machine is an enclosed container after inner drum opening 101 is fastened by door cover 4. Inner drum bottom 102 is provided with at least one drainage port 10. A sealing valve 9 which moves to be opened and closed along the radial direction of the corresponding inner drum bottom 102 is arranged at the corresponding drainage port 10. During the high-speed rotation of the inner drum 1, the valve bodies 92 of the sealing valves 9 move in surfaces parallel to the inner drum bottoms 102 under the action of a centrifugal force, so as to open the drainage ports 10 formed in the inner drum bottoms 102.

In the present embodiment, each sealing valve 9 includes the valve body 92 and a balancing weight 91. The valve bodies 92 and the balancing weights 91 are respectively hinged with the two ends of first connection rods 95. The inner drum bottom 102 and the balancing weights 91 are respectively hinged with the two ends of second connection rods 96. During the high-speed rotation of the inner drum 1, the balancing weights 91 move towards the peripheral direction of the inner drum bottoms 102 under the action of the centrifugal force and pull the valve bodies 92 through the first connection rods 95 to move along planes of the inner drum bottom 102 to open the corresponding drainage ports 10. Since the sealing valves are arranged on the inner drum bottom of the washing machine, the centrifugal force acts on the balancing weights during the high-speed rotation of the inner drum to enable the balancing weights to move towards the peripheral direction of the inner drums to pull the valve cores through the connection rods to move along the surfaces parallel to the inner drum bottoms, thus achieving the objective of opening the drainage ports formed in the inner drum bottom by using the centrifugal force during the high-speed rotation of the inner drum.

In the present embodiment, a mounting structure is arranged on the inner drum bottom 102, and the mounting structure includes a center portion 99 fixedly connected with the inner drum bottom 102. The center portion 99 is convexly provided with protruding ribs along the peripheral radial direction. The end portions of the second connection rods 96 are hinged with the protruding ends of the protruding ribs 910. Since the sealing valves 9 are mounted on the mounting structures composed of the center portions arranged on the inner drum bottoms 102 and the protruding ribs 910, the balancing weights 91 move towards the peripheral direction of the inner drum bottoms 102 under the action of the centrifugal force and the common action of the first connection rods 95 and the second connection rods 96 which are hinged with the balancing weights 91, and are limited by the second connection rods 96 hinged to the protruding ribs 910 to prevent separation. Since the balancing weights 91 are mounted on the protruding ribs 910 protruding from the center portions 99 at a certain distance, they are away from the center portions at the certain distance, thus guaranteeing a movement space of the balancing weights 91.

In the present embodiment, the plurality of drainage ports 10 are formed in the inner drum bottom 102. Each drainage port 10 is provided with the corresponding sealing valve 9. The valve bodies 92 of the sealing valves 9 move along the radial direction of the inner drum bottom 102 by the centrifugal force of the high-speed rotation of the inner drum 1 under the action of limiting structures, so as to correspondingly open the drainage ports 10. Preferably, the various drainage ports 10 are symmetrically disposed relative to the center of the inner drum bottom 102, so that the center and the gravity centers of the inner drum bottom 102 are ensured to overlap to prevent the inner drum 1 from being deviated.

In the present embodiment, mounting seats 97 for mounting the valve bodies 92 are arranged on the inner drum bottom 102, and the mounting seats 97 include limiting cavities 90 extending along the surfaces parallel to the inner drum bottom 102. The valve bodies 92 can be arranged in the limiting cavities 90 in a manner of moving along the surfaces parallel to the inner drum bottoms 102. The drainage ports 10 are relatively formed in the limiting cavities 90 to enable the valve bodies 92 to block the corresponding drainage ports 10 after the valve bodies 92 are closed. Preferably, the drainage ports 10 and the limiting cavities correspondingly overlap each other, so that the valve bodies 92 in the closed state block the corresponding drainage ports 10.

Through the above arrangement, the valve cores move in the limiting cavities formed in the inner drum bottoms. The valve cores only generate extending and retracting displacement along the axial direction of the cavities by the influence of the limiting cavities, thus ensuring extending and retracting movement of the valve cores along the axial direction of the limiting cavities under the action of the centrifugal force during the high-speed rotation of the inner drums to correspondingly open or close the drainage ports in the end portions of the limiting cavities and prevent the valve bodies from being separated and inclined.

In the present embodiment, the valve bodies 92 of the sealing valves 9 and/or the first connection rods 95 and/or the second connection rods 96 are connected with the inner drum bottom 102 through elastic recovery members, so as to apply an elastic force to the valve bodies 92 and push the valve bodies 92 to close the corresponding drainage ports 10. Furthermore, the centrifugal force counteracts the elastic force of the elastic recovery members during the high-speed rotation of the inner drums 1 to enable the valve bodies 92 to move and open the drainage ports 10. Through the arrangement of the elastic recovery members on the sealing valves 9, the valve bodies 91 are ensured to be at their initial closed positions to enable the valve bodies 92 to block the drainage ports 10. Meanwhile, after the sealing valves 9 are opened under the action of the centrifugal force, when the washing machine stops the execution of a dewatering program, the valve bodies 92 are reset to the initial closed position under the pulling action of the elastic recovery members to enable the valve bodies 92 to block the drainage ports 10, so as to ensure that the inner drum 1 is an enclosed container when the washing machine executes a washing program and a rinsing program to avoid the phenomenon of outflow of the washing water or the rinsing water.

In the present embodiment, the elastic recovery members are springs 911. One end of each spring 911 is connected with the corresponding second connection rod 96, and the other end of each spring 911 is fixed with the center portion of the corresponding mounting seat 97 arranged on the corresponding inner drum bottom 102. The balancing weights 91 are limited to move away from the mounting seats 97 under the action of pulling force of the springs 911, so as to limit the movement of the valve bodies 92 and block the drainage ports 10. Further preferably, one end of each spring 911 is connected with the end, hinged with the corresponding balancing weight 91, of the corresponding second connection rod 96, and the other end of each spring 911 is fixedly connected with the center of the center portion of the corresponding mounting seat 97.

In the present embodiment, the protruding ribs 910 and the valve bodies 92 are separately located on two sides of the center portions. The moving direction of the valve bodies 92 and the extending direction of the protruding ribs 910 are staggered. The first connection rods 95 and the second connection rods 96 are both located on the same side of the center portion.

In the present embodiment, preferably, the balancing weights 91 are close to the peripheries of the inner drum bottom 102 relative to the center portions, so as to ensure that the balancing weights 91 pull the valve bodies 92 through the second connection rods 96 to move when moving towards the peripheral direction of the inner drums 1 under the action of the centrifugal force, and push away the valve bodies 92 of the sealing valves 9 to open the drainage ports 10.

Preferably, in the present embodiment, the springs 911 extend along the radial direction of the inner drum bottom 102 to counteract the action of the centrifugal force on the balancing weights 91 to the maximum extent, thus ensuring that the extending and retracting direction of the springs 911 is parallel to the moving direction of the balancing weights 91 under the centrifugal force to make the pulling action of the springs 911 on the balancing weights 91 be maximized.

In the present embodiment, as shown in FIG. 7, when the washing machine is in the dewatering state, the inner drums 1 are in a high-speed rotation state, and the balancing weights 91 move towards the peripheries of the inner drum 1 under the action of the centrifugal force, and are limited by the first connection rods 95 and the second connection rods 96 which are hinged with the balancing weights 91, so that the balancing weights 91 move along the predetermined track direction. Furthermore, the balancing weights 91 pull the valve bodies 92 through the first connection rods 95 to move. The centrifugal force of the balancing weights 91 on the valve bodies 92 counteracts the elastic force of the springs 911, so that the valve bodies 92 move in the surfaces parallel to the inner drum bottom 102 and open the sealing valves. As shown in FIG. 6, when the washing machine is not in a dewatering state, the inner drum 1 is not in the high-speed rotation state, and the balancing weights 91 are no longer stressed by the centrifugal force. The springs 911 are in a pulled state and apply a pushing force that is towards the peripheral direction of the inner drum bottom 102 to the valve bodies 92, so that the valve bodies 92 move towards the initial positions until the sealing valves are closed. In addition, when the inner drum 1 is in the washing or rinsing program, the springs 911 keep providing the elastic force to the valve bodies 92 to ensure that the valve bodies 92 block the drainage ports 10 all the time, and then ensure that the drainage ports 10 in the inner drum bottom 102 are in the closed state all the time.

Embodiment III

Figure 9:
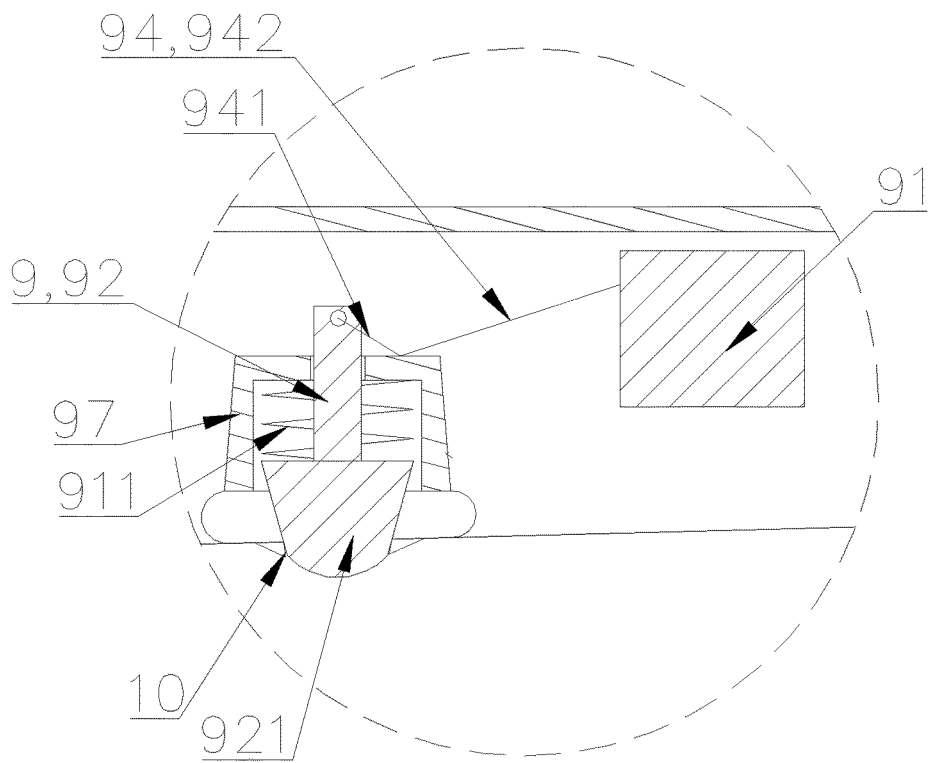
FIG. 9 is an enlarged structural schematic diagram of a closed state of a sealing valve at the position C in FIG. 8.
Figure 10:
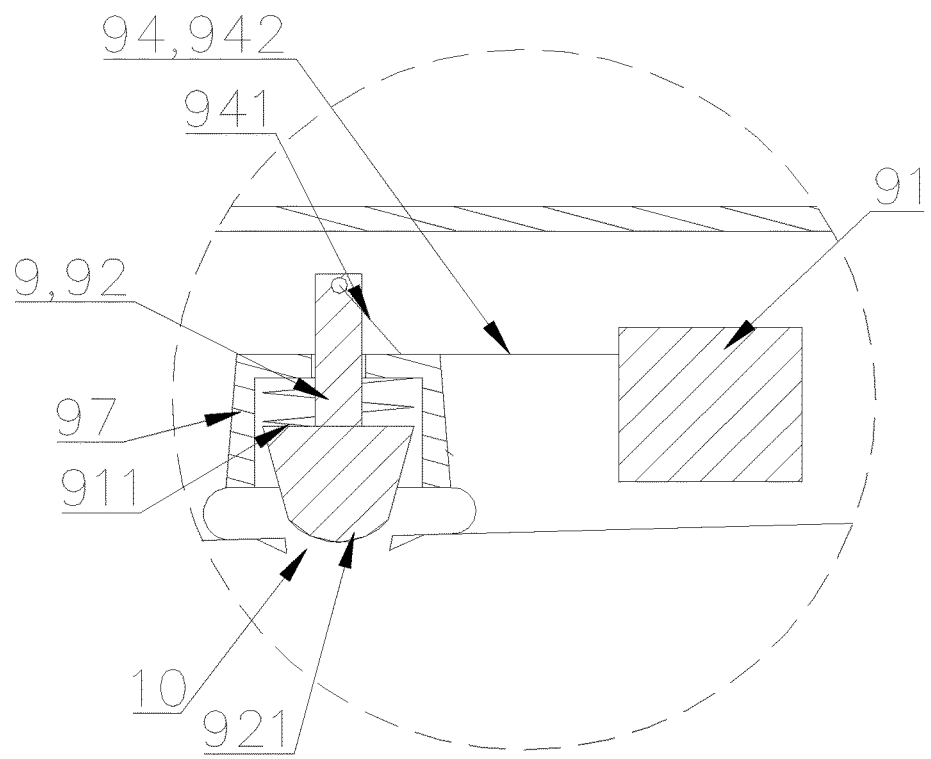
FIG. 10 is an enlarged structural schematic diagram of an open state of the sealing valve at the position C in FIG. 8.

In the embodiment of the present disclosure, in order to discharge a water flow separated from clothes in an inner drum 1 of a washing machine and realize that the inner drum 1 is sealed to hold water for normal washing during working of the washing machine, the following settings are carried out:

As shown in FIG. 8 to FIG. 10, the present embodiment discloses the washing machine. The inner drum 1 of the washing machine is an enclosed container after an inner drum opening 101 is fastened by a door cover 4. A plurality of lifting ribs 8 are arranged on the side wall of the inner drum 1. The lifting ribs 8 are hollow inside and communicate with the interior of the inner drum 1. At least one drainage port 10 communicating with the hollow portions of the lifting ribs 8 is formed in the side wall of the inner drum 1. Sealing valves 9 located inside lifting ribs 8 are arranged at the drainage ports 10. During the high-speed rotation of the inner drum 1, valve bodies 92 of the sealing valves 9 move along the radial center direction of the inner drum 1 under the action of a centrifugal force, so as to open the drainage ports 10 formed in the side wall of the inner drum 1.

Through the above arrangement, the objective of discharging the water flow in the inner drum from the hidden drainage ports is achieved by hiding the drainage ports inside the lifting ribs of the inner drum. Meanwhile, the sealing valves are arranged at the drainage ports to realize that the centrifugal force during the high-speed rotation of the inner drum is used to correspondingly control valve cores of the sealing valves, so as to correspondingly open and close the drainage ports, thus achieving the objective that the drainage ports are automatically opened to correspondingly discharge the water in the inner drum after the centrifugal force of the high-speed rotation of the inner drum acts on the valve cores of the sealing valves when the washing machine executes a dewatering program.

In the present embodiment, the lifting ribs 8 are hollow inside, and a circle of gap is formed in a joint of the bottom portion of each lifting rib 8 and the side wall of the inner drum 1, and the circle of gap constitutes a water flow passage enabling the hollow portion inside the lifting rib 8 to communicate with the interior of the inner drum 1. Therefore, the objective that the water flow in the inner drum 1 can flow into the hollow portions of the lifting ribs 8 through the water flow passages is achieved.

In the present embodiment, at least one drainage port 10 is formed in the position, corresponding to the hollow portions of the lifting ribs 8, on the side wall of the inner drum 1 and enables the hollow portions of the lifting ribs 8 to communicate with the outside, so as to discharge the washing water flowing into the hollow portions of the lifting ribs 8 through the drainage ports 10. Meanwhile, each drainage port 10 is correspondingly provided with the sealing valve 9, so as to be controllably opened and closed to enable the water flow flowing into the hollow portions of the lifting ribs 8 to flow out of the drainage ports 10 in an opening and closing mode under the action of the sealing valves 9.

In the present embodiment, each sealing valve 9 includes the corresponding valve body 92 and a balancing weight 91. The valve bodies 92 and the balancing weights 91 are fixedly connected with the two ends of supporting rods 94, respectively. The middle portions of the supporting rods 94 are in supporting contact with the inner drum 1, so that the balancing weights 91 move up and down along the radial direction of the inner drum 1 under the action of the centrifugal force during the high-speed rotation of the inner drum 1. The valve bodies 92 are prized by the supporting rods 94 to generate displacement opposite to the motion direction of the balancing weights 91 along the radial direction of the inner drum 1.

Through the arrangement of the above sealing valves at the drainage ports, the balancing weights move towards the peripheral direction of the inner drum under the action of the centrifugal force during the high-speed rotation of the inner drum, and then the valve cores are downwards prized to move upwards through pivots of the supporting rods, so that the valve cores move to correspondingly open the drainage ports to achieve the objective of correspondingly opening the drainage ports by using the centrifugal force.

In the present embodiment, each supporting rod 94 includes a first rod portion 941 and a second rod portion 942 which are arranged in a staggered manner. Joints of the first rod portions 941 and the second rod portions 942 are lower than both the two ends of the supporting rods, and the joints are in supporting contact with the inner drum 1, so that the valve bodies 92 and the balancing weights 91 at the two ends of the supporting rods 94 rotatably move up and down around the joints. Each supporting rod is designed as the above structure, so that the valve bodies and the balancing weights form structures similar to a "teeterboard" through the supporting rods. Therefore, under the action of the centrifugal force, the balancing weights prize the valve bodies to move in the opposite direction to achieve the objective of automatically opening the valve cores of the sealing valves by using the centrifugal force.

In the present embodiment, the end portions of the first rod portions 941 are hinged with the valve bodies 92, and the end portions of the second rod portions 942 are fixedly connected with the balancing weights 91. The axial length of the first rod portions 941 is less than the axial length of the second rod portions 942. Since the length of the first rod portions are set to be less than the length of the second rod portions, the balancing weights may push away the valve bodies only after the balancing weights move a relatively large range to enable the control accuracy of the whole structure to be obviously improved. Meanwhile, after a relatively low external force is applied to the balancing weights, a relatively high acting force may be provided to the valve cores, so as to reduce the intensity of the acting force when the valve bodies move and open the drainage ports.

In the present embodiment, the hollow portion of each lifting rib 8 is provided with a mounting seat 97 fixed to the side wall of the inner drum 1. The valve bodies 92 of the sealing valves 9 can be mounted on the mounting seats 97 in a manner of moving along the radial direction of the inner drum 1. One ends of the valve bodies 92 penetrate out of the mounting seats 97 and are connected with the end portions of the supporting rods, and the other ends of the valve bodies 92 correspond to the drainage ports 10 formed in the side wall of the inner drum 1.

In the present embodiment, each mounting seat 97 is a tapered body arranged correspondingly coaxial with each drainage port 10. The tapered bodies are hollow inside to mount the valve bodies 92. The upper ends of the valve bodies 92 penetrate out from the top portions of the tapered bodies and are hinged with the supporting rods 94, and the lower ends of the valve bodies 92 are provided with plugs 921 for correspondingly sealing the drainage ports 10. Preferably, the diameter of openings in the top portions of the tapered bodies is less than the diameter of the peripheries of the plugs 921 to avoid the plugs from falling off from the mounting seats 97. Further preferably, joints of the supporting rods 94 are in limiting contact with the top portions of the tapered bodies, so that the contact positions of the supporting rods 94 and the top surfaces of the tapered bodies are used as supporting points to enable the balancing weights 91 at the end portions of the supporting rods 94 to move up and down around the supporting points.

Since the mounting seats extending towards the hollow portions of the lifting ribs are arranged on the side wall of the inner drum, the supporting rods are mounted at the top portions of the mounting seats at a certain height away from the side wall of the inner drum to enable the end portions of the supporting rods and the side wall of the inner drum to have a certain height difference, which achieves the objective that the supporting rods downwards move and drop to provide displacement spaces for prying the valve bodies.

In the present embodiment, the valve bodies 92 of the sealing valves 9 and/or the supporting rods 94 are connected with the inner drum 1 through elastic recovery members, so as to apply an elastic force to the valve bodies 92 and push the valve bodies 92 to close the corresponding drainage ports 10. Furthermore, the centrifugal force counteracts the elastic force of the elastic recovery members during the high-speed rotation of the inner drum 1 to enable the valve bodies 92 to move and open the drainage ports 10. Through the arrangement of the elastic recovery members on the sealing valves 9, the valve bodies 91 are ensured to be at their initial closed positions to enable the valve bodies 92 to block the drainage ports 10. Meanwhile, after the sealing valves 9 are opened under the action of the centrifugal force, when the washing machine stops the execution of the dewatering program, the valve bodies 92 are reset to the initial closed position under the pulling action of the elastic recovery members to enable the valve bodies 92 to block the drainage ports 10, so as to ensure that the inner drum 1 is the closed container when the washing machine executes a washing program and a rinsing program to avoid the phenomenon of outflow of the washing water or the rinsing water.

Preferably, the elastic recovery members are springs 911. The springs 911 are arranged at the peripheries of the valve bodies 92 in a sleeving manner and extend along the radial direction of the inner drum 1. The two ends of the springs 911 are respectively in limiting contact with the plugs of the valve bodies 92 and the top ends of the mounting seats 97, so that the springs 911 are clamped between the valve bodies 92 and the mounting seats 97.

Preferably, in the present embodiment, the lifting ribs 8 extend along the axial direction of the inner drum 1. Each of the front and rear ends of the hollow portion of each lifting rib 8 is provided with the corresponding at least one drainage port 10. The sealing valves 9 are correspondingly mounted at the drainage ports 10. The balancing weights 91 of two sealing valves 9 are both deviated towards the center direction of the inner drum 1 relative to the corresponding drainage ports 10. Since the balancing weights of the sealing valves at the two ends of each lifting rib are oppositely disposed, the gravity center of the inner drum is located at the middle portion to improve the steadiness of the inner drum during the rotation.

In the present embodiment, as shown in FIG. 10, when the washing machine is in a dewatering state, the inner drum 1 is in a high-speed rotation state, and the water in the inner drum 1 flows on the inner wall under the action of the centrifugal force and flows into the lifting ribs 8 from the gaps between the wall of the inner drum 1 and the lifting ribs 8. At this time, the balancing weights 91 move towards the periphery of the inner drum 1 under the action of the centrifugal force and provide an upward prying force that is towards the center direction of the inner drum 1 to the valve bodies 92 through the supporting rods 94. The centrifugal force of the balancing weights 91 on the valve bodies 92 counteracts the elastic force of the springs 911, so that the valve bodies 92 move along the radial direction of the inner drum 1 and open the drainage ports 10. As shown in FIG. 9, when the washing machine is not in a dewatering state, the inner drum 1 is not in the high-speed rotation state, and the balancing weights 91 are no longer stressed by the centrifugal force. The springs 911 are in a pulled state and apply a pushing force that is towards the peripheral direction of the inner drum bottom 102 to the valve bodies 92, so that the valve bodies 92 move towards the initial positions until the drainage ports 10 are closed. In addition, when the inner drum 1 is in the washing or rinsing program, the springs 911 keep providing the elastic force for the valve bodies 92 to ensure that the valve bodies 92 block the drainage ports 10 all the time, and then ensure that the drainage ports 10 in the inner drum bottom 102 are in the closed state all the time.

Embodiment IV

Figure 11:
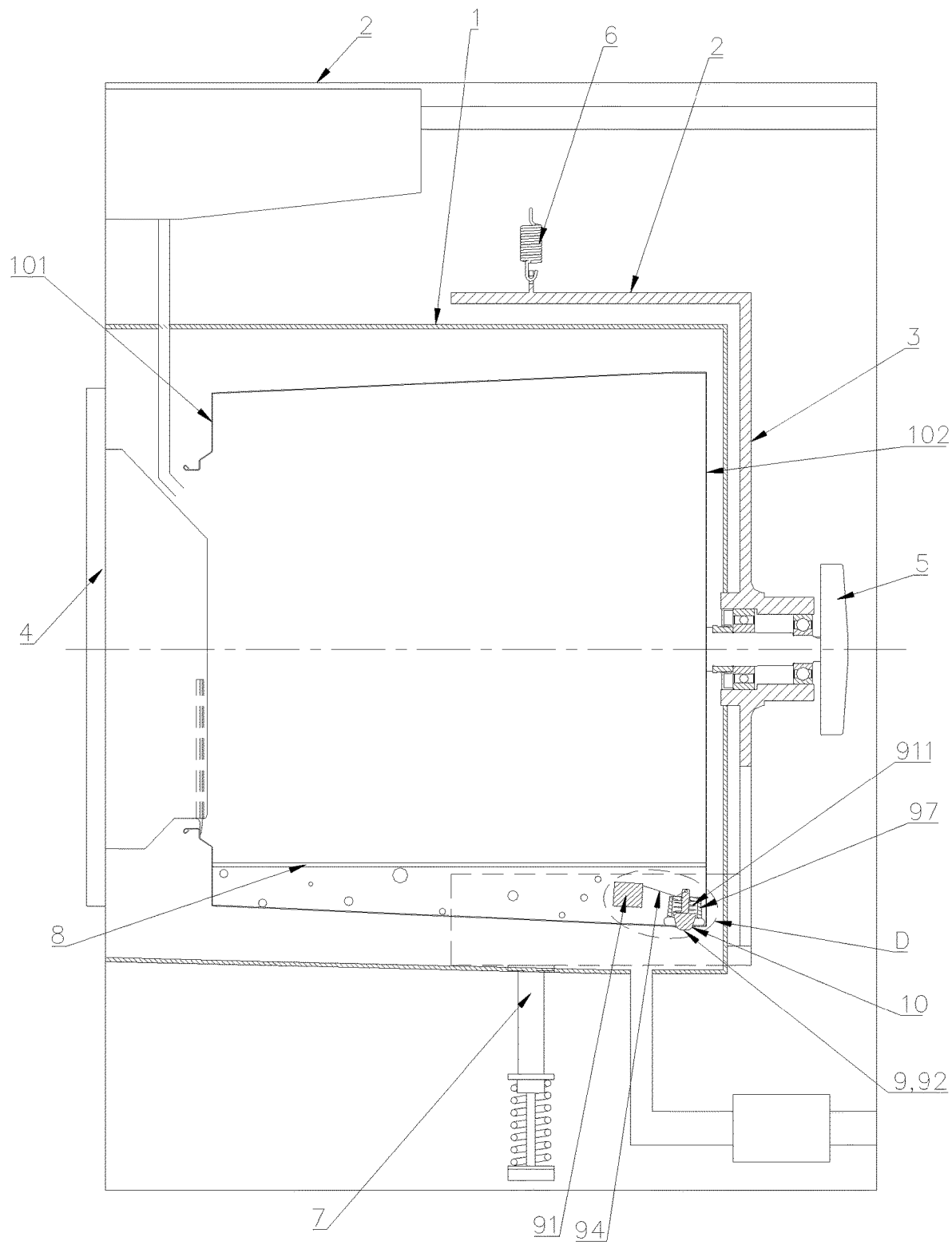
FIG. 11 is a structural schematic diagram of a washing machine in Embodiment IV of the present disclosure.
Figure 12:
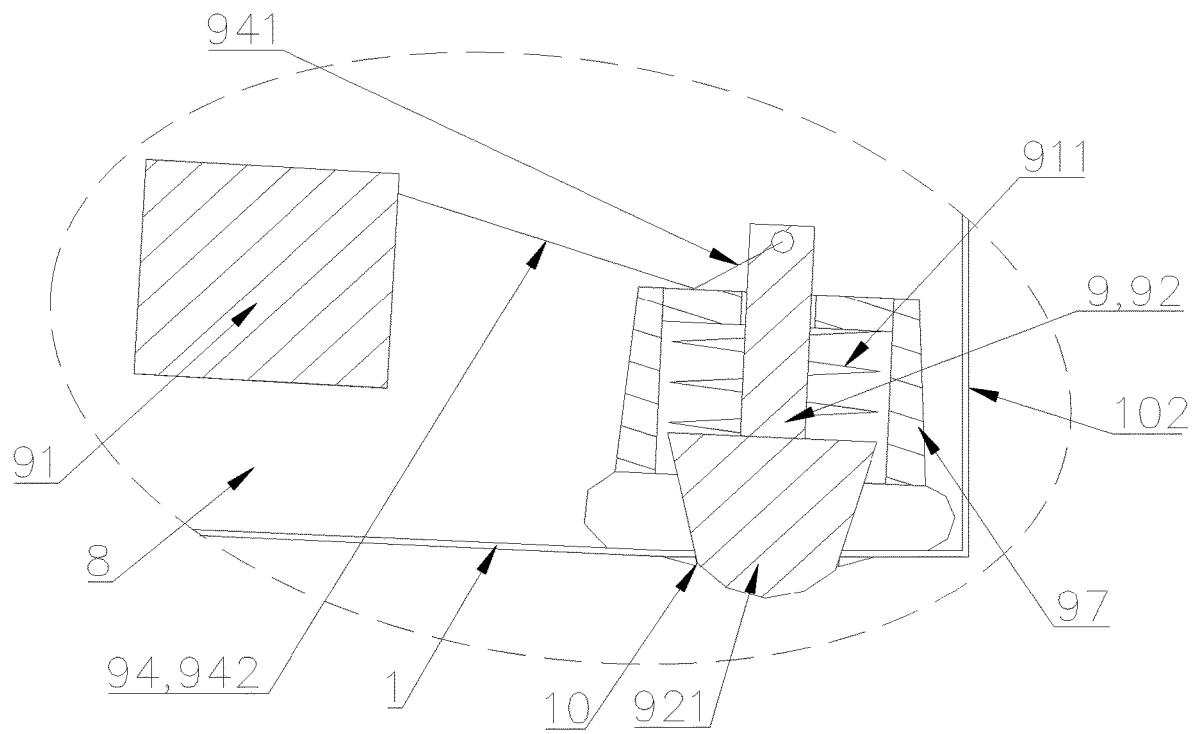
FIG. 12 is an enlarged structural schematic diagram of a closed state of a sealing valve at the position D in FIG. 11.
Figure 13:
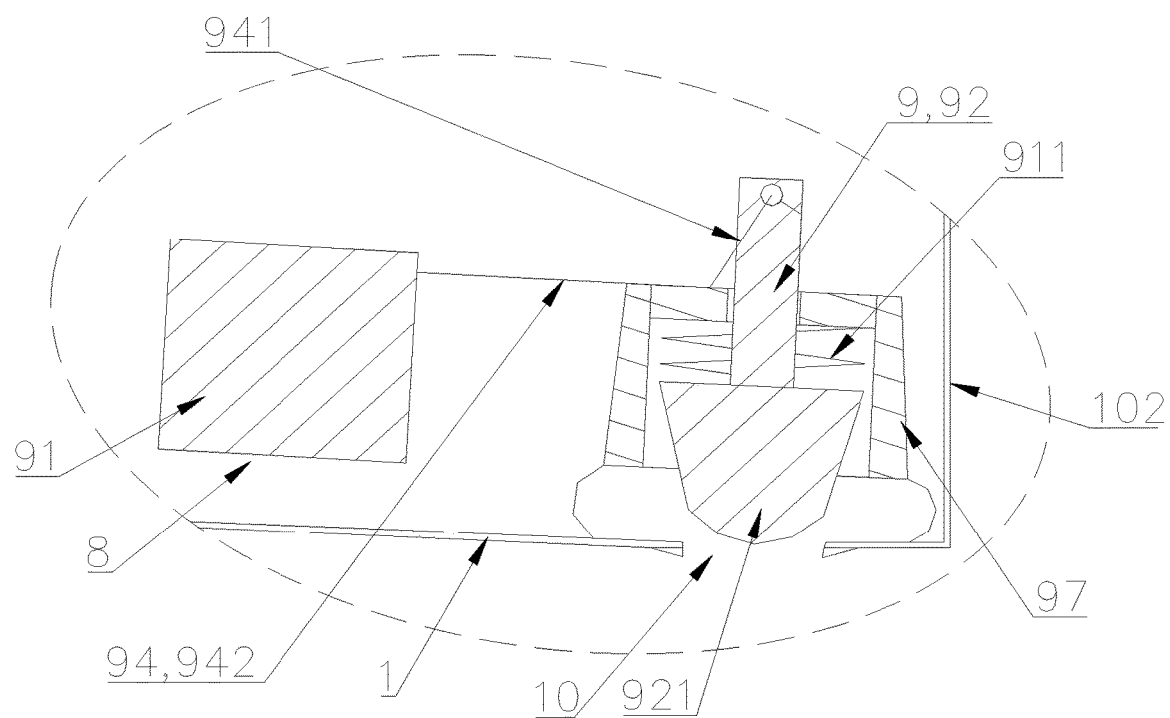
FIG. 13 is an enlarged structural schematic diagram of an open state of the sealing valve at the position D in FIG. 11.

In the embodiment of the present disclosure, in order to discharge a water flow separated from clothes in an inner drum 1 of a washing machine and realize that the inner drum 1 is sealed to hold water for normal washing during working of the washing machine, the following settings are carried out:

As shown in FIG. 11 to FIG. 13, the present embodiment discloses the washing machine. The inner drum 1 of the washing machine is an enclosed container after an inner drum opening 101 is fastened by a door cover 4. The inner drum 1 is a tapered drum in which the end with an inner drum bottom 102 and the end with the inner drum opening 101 are not equal in size. A plurality of lifting ribs 8 are arranged on the side wall of the inner drum 1. The lifting ribs 8 are hollow inside and communicate with the interior of the inner drum 1. At least one drainage port 10 communicating with the hollow portions of the lifting ribs 8 is formed in the side wall of the inner drum 1 and is disposed on the side close to the large-opening end of the inner drum. A sealing valve 9 located inside each lifting rib 8 is arranged at each drainage port 10. During the high-speed rotation of the inner drum 1, valve bodies 92 of the sealing valves 9 move along the radial center direction of the inner drum 1 under the action of a centrifugal force, so as to open the drainage ports 10 formed in the side wall of the inner drum 1.

Through the above arrangement, the objective of discharging the water flow in the inner drum from the hidden drainage ports is achieved by hiding the drainage ports inside the lifting ribs of the inner drum. Meanwhile, the sealing valves are arranged at the drainage ports to realize that the centrifugal force during the high-speed rotation of the inner drum is used to correspondingly control valve cores of the sealing valves, so as to correspondingly open and close the drainage ports, thus achieving the objective that the drainage ports are automatically opened to correspondingly discharge the water in the inner drum after the centrifugal force of the high-speed rotation of the inner drum acts on the valve cores of the sealing valves when the washing machine executes a dewatering program.

In the present embodiment, the lifting ribs 8 extend along the axial direction of the inner drum 1. The first end portions of the lifting ribs 8 extend to the large-opening end of the inner drum 1. The drainage ports 10 in the side wall of the inner drum 1 are all formed in the first end portions of the lifting ribs 8. Preferably, the axial lines of the drainage ports 10 are parallel to the axis of the inner drum 1. Since the inner drum is designed as a tapered drum having a large end and a small end, the water in the inner drum is gathered and flows towards the large-opening end under the action of the centrifugal force during the high-speed rotation of the inner drum and flows out from the drainage ports in the large-opening end. Therefore, the water flow in the inner drum is completely discharged under the action of the centrifugal force during high-speed dewatering of the inner drum, and the water flow produced by spin-drying of the clothes in the inner drum is completely discharged when the washing machine executes the dewatering program, thus avoiding the phenomenon of water retention in the inner drum.

In the present embodiment, the lifting ribs 8 are hollow inside, and a circle of gap is formed in a joint of the bottom portion of each lifting rib 8 and the side wall of the inner drum 1, and the gap constitutes a water flow passage enabling the hollow portion inside the lifting rib 8 to communicate with the interior of the inner drum 1. Therefore, the objective that the water flow in the inner drum 1 can flow into the hollow portions of the lifting ribs 8 through the water flow passages is achieved.

In the present embodiment, at least one drainage port 10 is formed in the side wall of the inner drum 1 corresponding to the hollow portions of the lifting ribs 8 and enables the hollow portions of the lifting ribs 8 to communicate with the outside, so as to discharge the washing water flowing into the hollow portions of the lifting ribs 8 through the drainage ports 10. Preferably, the various drainage ports 10 are symmetrically disposed relative to the axial line of the inner drum 1, so that the center and the gravity center of the inner drum 1 overlap to prevent the inner drum 1 from being deviated during rotation.

In the present embodiment, each sealing valve 9 includes the corresponding valve body 92 and a balancing weight 91. The valve bodies 92 and the balancing weights 91 are fixedly connected with the two ends of supporting rods, respectively. The middle portions of the supporting rods are in supporting contact with the inner drum 1, so that the balancing weights 91 move up and down along the radial direction of the inner drum 1 under the action of the centrifugal force during the high-speed rotation of the inner drum 1. The valve bodies 92 are prized by the supporting rods to generate displacement opposite to the motion direction of the balancing weights 91 along the radial direction of the inner drum 1.

In the present embodiment, each supporting rod 94 includes a first rod portion 941 and a second rod portion 942 which are arranged in a staggered manner. Joints of the first rod portions 941 and the second rod portions 942 are both lower than the two ends of the supporting rods, and the joints are in supporting contact with the inner drum 1, so that the valve bodies 92 and the balancing weights 91 at the two ends of the supporting rods rotatably move up and down around the joints. Preferably, the end portions of the first rod portions 941 are hinged with the valve bodies 92, and the end portions of the second rod portions 942 are fixedly connected with the balancing weights 91. The axial length of the first rod portions is less than the axial length of the second rod portions.

In the present embodiment, the hollow portion of each lifting rib 8 is provided with a mounting seat 97 fixed to the side wall of the inner drum 1. The valve bodies 92 of the sealing valves 9 can be mounted on the mounting seats 97 in a manner of moving along the radial direction of the inner drum 1. One ends of the valve bodies 92 penetrate out of the mounting seats 97 and are connected with the end portions of the supporting rods, and the other ends of the valve bodies 92 correspond to the drainage ports 10 formed in the side wall of the inner drum 1.

In the present embodiment, each mounting seat 97 is a tapered body correspondingly coaxial with each drainage port 10. The tapered bodies are hollow inside to mount the valve bodies 92. The upper ends of the valve bodies 92 penetrate out from the top portions of the tapered bodies and are hinged with the supporting rods, and the lower ends of the valve bodies 92 are provided with plugs for correspondingly sealing the drainage ports 10. Preferably, the diameter of openings in the top portions of the tapered bodies is less than the diameter of the peripheries of the plugs 921 to avoid the plugs from falling off from the mounting seats 97. Further preferably, joints of the supporting rods 94 are in limiting contact with the top portions of the tapered bodies, so that the contact positions of the supporting rods and the top surfaces of the tapered bodies are used as supporting points to enable the balancing weights 91 at the end portions of the supporting rods to move up and down around the supporting points.

In the present embodiment, preferably, the hollow regions inside the tapered bodies are set as sealed cavities, so that when water flows in the hollow portions of the lifting ribs 8 flows out from the mounting seats 97 to the drainage ports 10, a pressure difference is generated at two ends of flow passages formed in the mounting seats 97, and thus the water flows in the lifting ribs 8 generate a siphon effect under the action of the pressure difference to completely discharge the water flows in the lifting ribs 8 to the outside through the drainage ports 10.

In the present embodiment, the valve bodies 92 of the sealing valves 9 and/or the supporting rods 94 are connected with the inner drum 1 through elastic recovery members, so as to apply an elastic force to the valve bodies 92 and push the valve bodies 92 to close the corresponding drainage ports 10. Furthermore, the centrifugal force counteracts the elastic force of the elastic recovery members during the high-speed rotation of the inner drum 1 to enable the valve bodies 92 to move and open the drainage ports 10. Through the arrangement of the elastic recovery members on the sealing valves, the valve bodies are ensured to be at their initial closed positions to enable the valve bodies to block the drainage ports. Meanwhile, after the sealing valves are opened under the action of the centrifugal force, when the washing machine stops the execution of the dewatering program, the valve cores are reset to the initial closed position under the pulling action of the elastic recovery members to enable the valve bodies to block the drainage ports, so as to ensure that the inner drum is an enclosed container when the washing machine executes a washing program and a rinsing program to avoid the phenomenon of outflow of washing water or rinsing water.

Preferably, in the present embodiment, the elastic recovery members are springs 911. The springs 911 are arranged at the peripheries of the valve bodies 92 in a sleeving manner and extend along the radial direction of the inner drum 1. Two ends of the springs 911 are respectively in limiting contact with the plugs of the valve bodies 92 and the top ends of the mounting seats 97, so that the springs 911 are clamped between the valve bodies 92 and the mounting seats 97.

In the present embodiment, the balancing weights 91 of the sealing valves 9 are deviated towards the center direction of the inner drum 1 relative to the corresponding drainage ports 10, so as to avoid the weight of the inner drum 1 from being all concentrated to the rear portion of the inner drum 1 to make the center of the inner drum 1 move forwards, and thus the steadiness of the inner drum 1 during the rotation is improved.

In the present embodiment, as shown in FIG. 13, when the washing machine is in a dewatering state, the inner drum 1 is in a high-speed rotation state, and the water in the inner drum 1 flows on the inner wall under the action of the centrifugal force, flows into the lifting ribs 8 from the gaps between the wall of the inner drum 1 and the lifting ribs 8, and then is gathered and flows towards the large-opening end of the inner drum 1 along the wall of the inner drum 1. At this time, the balancing weights 91 move towards the periphery of the inner drum 1 under the action of the centrifugal force and provide an upward prying force that is towards the center direction of the inner drum 1 to the valve bodies 92 through the supporting rods. The centrifugal force of the balancing weights 91 on the valve bodies 92 counteracts the elastic force of the springs 911, so that the valve bodies 92 move along the radial direction of the inner drum 1 and open the drainage ports 10. As shown in FIG. 12, when the washing machine is in a non-dewatering state, the inner drum 1 is not in the high-speed rotation state, and the balancing weights 91 are no longer stressed by the centrifugal force. The springs 911 are in a pulled state and apply a pushing force that is towards the peripheral direction of the inner drum bottom 102 to the valve bodies 92, so that the valve bodies 92 move towards the initial positions until the drainage ports 10 are closed. In addition, when the inner drum 1 is in the washing or rinsing program, the springs 911 keep providing the elastic force to the valve bodies 92 to ensure that the valve bodies 92 block the drainage ports 10 all the time, and then ensure that the drainage ports 10 in the inner drum bottom 102 are in the closed state all the time.

Embodiment V

Figure 14:
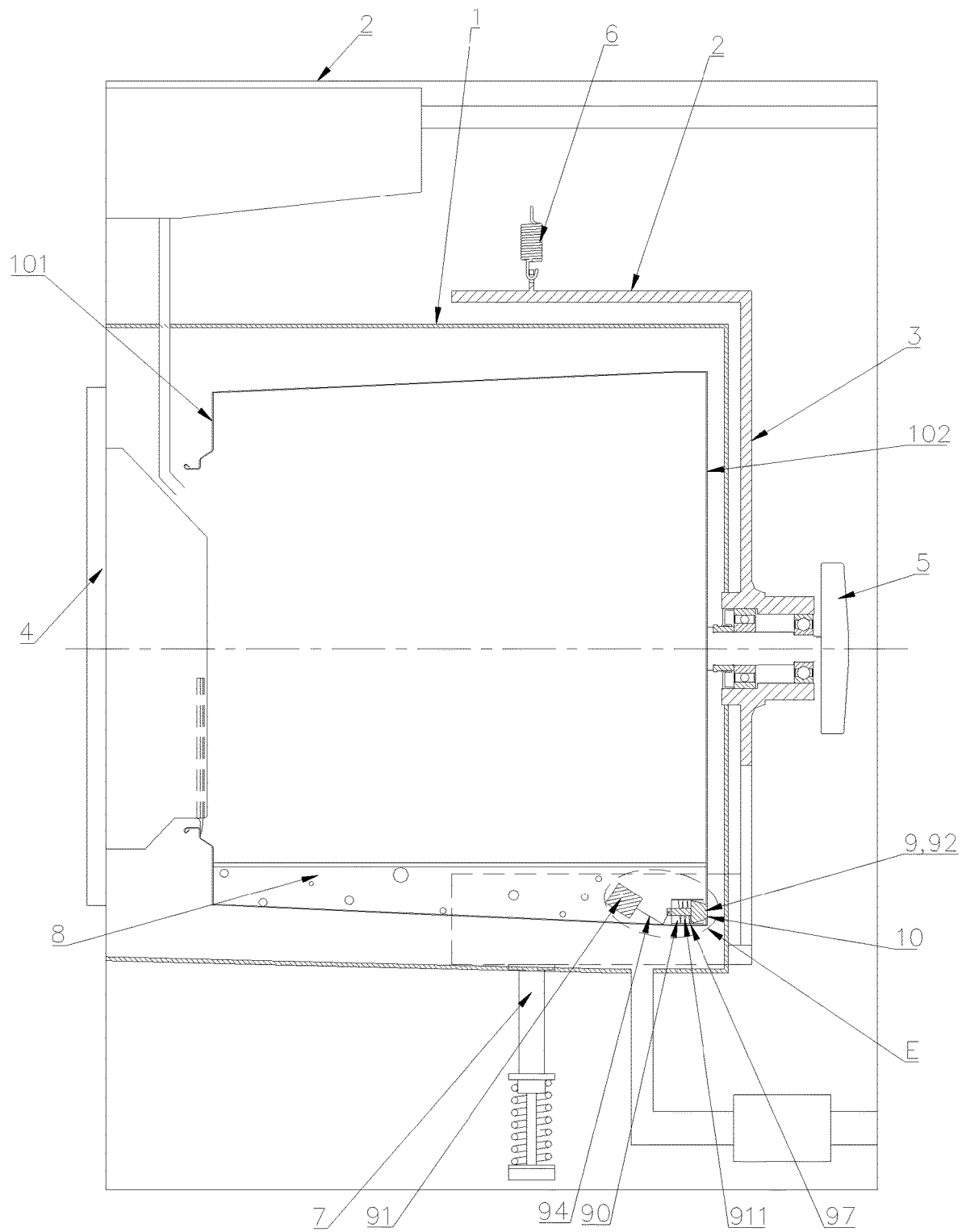
FIG. 14 is a structural schematic diagram of a washing machine in Embodiment V of the present disclosure.
Figure 15:
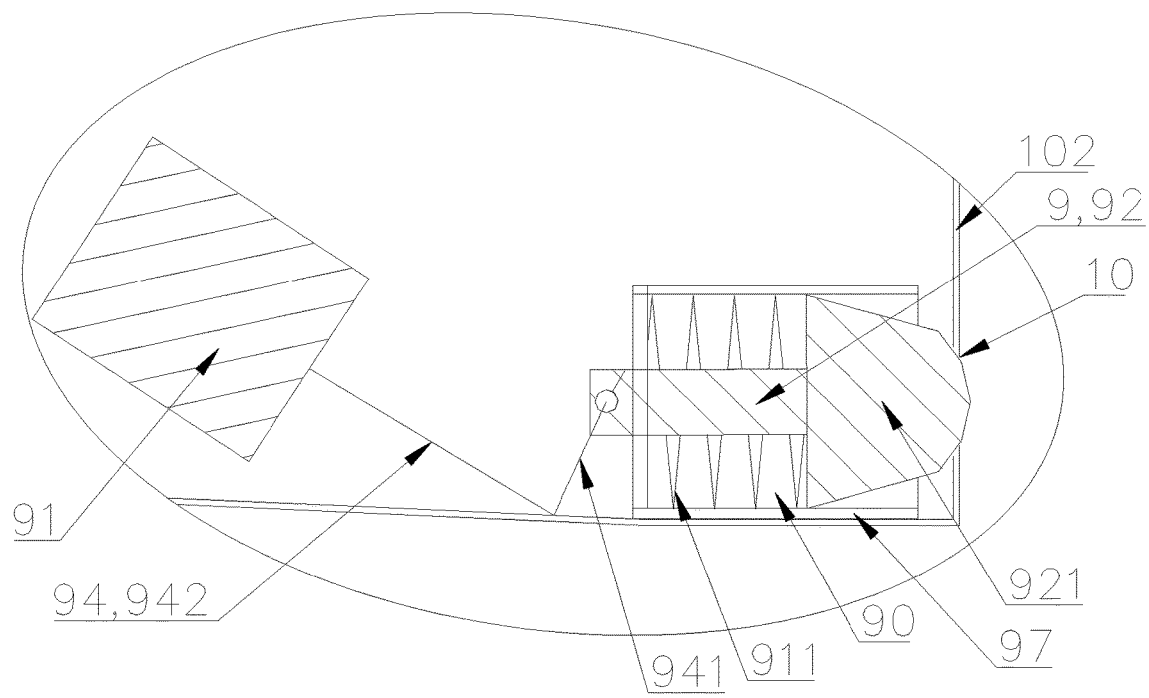
FIG. 15 is an enlarged structural schematic diagram of a closed state of a sealing valve at the position E in FIG. 14.
Figure 16:
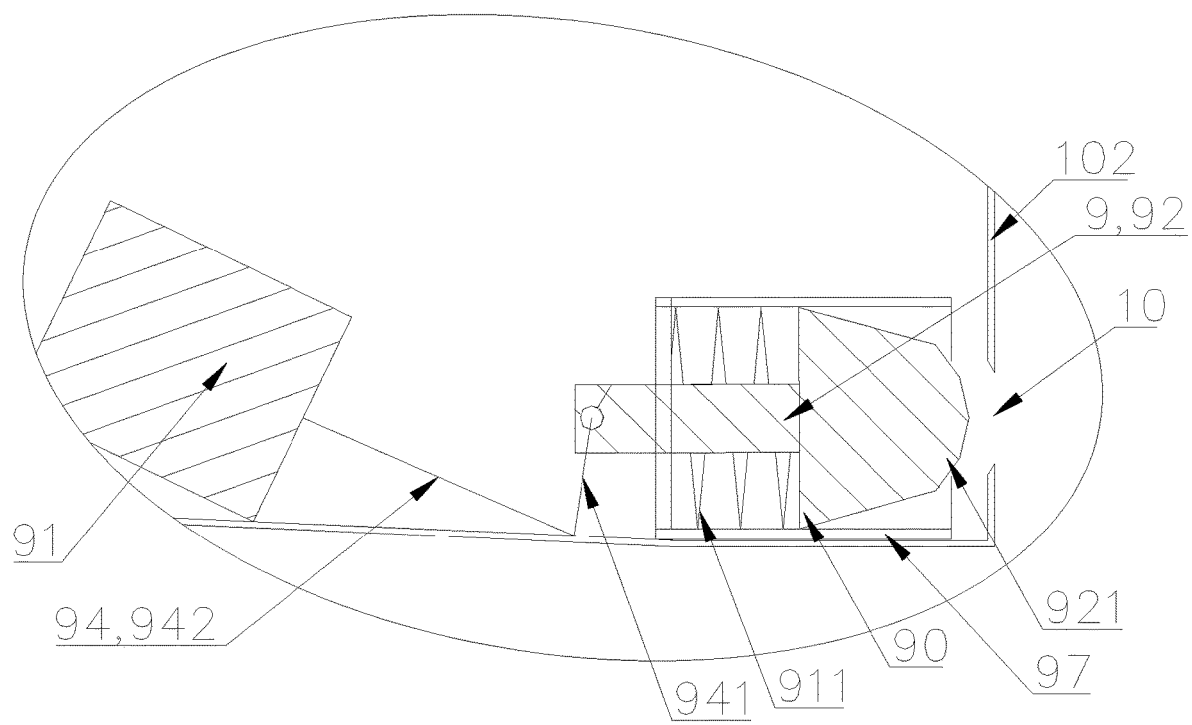
FIG. 16 is an enlarged structural schematic diagram of an open state of the sealing valve at the position E in FIG. 14.

In the embodiment of the present disclosure, in order to discharge a water flow separated from clothes in an inner drum 1 of a washing machine and realize that the inner drum 1 is sealed to hold water for normal washing during working of the washing machine, the following settings are carried out:

As shown in FIG. 14 to FIG. 16, the present embodiment discloses the washing machine. The inner drum 1 of the washing machine is an enclosed container after an inner drum opening 101 is fastened by a door cover 4. The inner drum 1 is a tapered drum in which the end with an inner drum bottom 102 and the end with the inner drum opening 101 are not equal in size. A plurality of lifting ribs 8 are arranged on the side wall of the inner drum 1. The lifting ribs 8 are hollow inside and communicate with the interior of the inner drum 1. At least one drainage port 10 communicating with the hollow portions of the lifting ribs 8 is formed in the large-opening end portion of the inner drum 1. A sealing valve 9 located inside each lifting rib 8 is arranged at each drainage port 10. During the high-speed rotation of the inner drum 1, valve bodies 92 of the sealing valves 9 move along the axial direction of the inner drum 1 towards the middle portion of the inner drum 1 under the action of a centrifugal force, so as to open the drainage ports 10 formed in the end portion of the inner drum 1.

Through the above arrangement, the objective of discharging the water flow in the inner drum 1 from the hidden drainage ports 10 is achieved by hiding the drainage ports 10 inside the lifting ribs 8 of the inner drum 1. Meanwhile, the drainage ports 10 are formed in the positions, at the end portions of the lifting ribs 8, of the large-opening end of the inner drum 1, and the sealing valves 9 are arranged at the drainage ports 10, so as to realize that the centrifugal force during the high-speed rotation of the inner drum 1 is used to correspondingly control the valve bodies 92 of the sealing valves 9 to correspondingly open and close the drainage ports 10, thus achieving the objective that the drainage ports 10 are automatically opened to enable the water in the inner drum 1 to be gathered and flow towards the large-opening end under the action of the centrifugal force after the centrifugal force of the high-speed rotation of the inner drum 1 acts on the valve bodies 92 of the sealing valves 9 when the washing machine executes a dewatering program, and siphon drainage is performed through the drainage ports 10 formed inside the lifting ribs 8.

In the present embodiment, the plurality of drainage ports 10 are formed in the large-opening end of the inner drum 1 and are symmetrically disposed relative to the axis of the inner drum 1. The drainage ports 10 are formed in the periphery of the large-opening end of the inner drum 1.

In the present embodiment, each sealing valve 9 includes the valve body 92 and a balancing weight 91. The valve bodies 92 and the balancing weights 91 are fixedly connected with two ends of supporting rods, respectively. The middle portions of the supporting rods are in supporting contact with the inner drum 1, so that the balancing weights 91 move up and down along the radial direction of the inner drum 1 under the action of the centrifugal force during the high-speed rotation of the inner drum 1. The valve bodies 92 are prized by the supporting rods to generate extending and retracting displacement along the axial direction of the inner drum 1.

In the present embodiment, each supporting rod 94 includes a first rod portion 941 and a second rod portion 942 which are arranged in a staggered manner. Joints of the first rod portions 941 and the second rod portions 942 are lower than both the two ends of the supporting rods, and the joints are in supporting contact with the inner drum 1, so that the valve bodies 92 and the balancing weights 91 at the two ends of the supporting rods rotatably move up and down around the joints. Preferably, the end portions of the first rod portions 941 are hinged with the valve bodies 92, and the end portions of the second rod portions 942 are fixedly connected with the balancing weights 91. The axial length of the first rod portions 941 is less than the axial length of the second rod portions 942.

In the present embodiment, the hollow portion of each lifting rib 8 is provided with a mounting seat 97 fixed to the side wall of the inner drum 1. The axial lines of the mounting seats 97 extend along the axial direction of the inner drum 1. The valve body 92 may be mounted on the mounting seats 97 in a manner of moving along the axial direction of the inner drum 1. One ends of the valve bodies 92 penetrate out of the mounting seats 97 and are connected with the end portions of the supporting rods, and the other ends of the valve bodies 92 correspond to the drainage ports 10 formed in the end portion of the inner drum 1.

In the present embodiment, preferably, the hollow regions inside the mounting seats 97 are set as sealed cavities, so that when water flows in the hollow portions of the lifting ribs 8 flow out from the mounting seats 97 to the drainage ports 10, a pressure difference is generated at two ends of flow passages formed in the mounting seats 97, and thus the water flows in the lifting ribs 8 generate a siphon effect under the action of the pressure difference to completely discharge the water flows in the lifting ribs 8 to the outside through the drainage ports 10.

In the present embodiment, the mounting seats 97 extend along a structural line of the side wall of the inner drum 1. The structural line of the inner drum 1 rotates 360 degrees around the axial line of the inner drum 1 to form line segments of the tapered side wall of the inner drum 1. The first ends of the mounting seats 97 correspond to the corresponding drainage ports 10, and the second ends of the mounting seats 97 realize penetrating out and mounting of the end portions of the valve bodies 92. One ends of the valve bodies 92 penetrate out of the first ends of the mounting seats 97, and are hinged with supporting rods, and the other ends of the valve bodies 92 are provided with plugs 921 for correspondingly sealing the drainage ports 10. Preferably, the first ends of the mounting seats 97 are provided with openings for allowing the valve bodies 92 to penetrate out. The diameter of the openings is less than the diameter of the peripheries of the plugs, so as to avoid the plugs from falling off from the mounting seats 97. Further preferably, joints of the supporting rods 94 are in limiting contact with the top portion of the inner drum 1, so that the contact positions of the supporting rods 94 and the side wall of the inner drum 1 are used as supporting points to enable the balancing weights 91 at the end portions of the supporting rods 94 to move up and down around the supporting point to prize the valve bodies 92 to generate sliding displacement.

In the present embodiment, the valve bodies 92 of the sealing valves 9 and/or the supporting rods 94 are connected with the inner drum 1 through elastic recovery members, so as to apply an elastic force to the valve bodies 92 and push the valve bodies 92 to close the corresponding drainage ports 10. Furthermore, the centrifugal force counteracts the elastic force of the elastic recovery members during the high-speed rotation of the inner drum 1 to enable the valve bodies 92 to move and open the drainage ports 10. Through the arrangement of the elastic recovery members on the sealing valves, the valve bodies are ensured to be at their initial closed positions to enable the valve bodies to block the drainage ports. Meanwhile, after the sealing valves are opened under the action of the centrifugal force, when the washing machine stops the execution of the dewatering program, valve cores are reset to the initial closed positions under the pulling action of the elastic recovery members to enable the valve bodies to block the drainage ports, so as to ensure that the inner drum is an enclosed container when the washing machine executes a washing program and a rinsing program to avoid the phenomenon of outflow of the washing water or the rinsing water.

Preferably, in the present embodiment, the elastic recovery members are springs 911. The springs 911 are arranged at the peripheries of the valve bodies 92 in a sleeving manner and extend along the axial directions of the mounting seats 97. The two ends of the springs 911 are respectively in limiting contact with the plugs of the valve bodies 92 and the first ends of the mounting seats 97, so that the springs 911 are clamped between the valve bodies 92 and the mounting seats 97.

In the present embodiment, the balancing weights 91 of the sealing valves 9 are deviated towards the center direction of the inner drum 1 relative to the corresponding drainage ports 10, so that the entire gravity center of the inner drum 1 moves forwards to avoid the phenomenon that the gravity center of the inner drum 1 is concentrated at the rear portion to make the inner drum 1 tilt backwards.

In the present embodiment, the lifting ribs 8 extend along the axial direction of the inner drum 1. The first end portions of the lifting ribs 8 extend to the large-opening end of the inner drum 1. The drainage ports 10 in the side wall of the inner drum 1 are all formed in the hollow portions of the first end portions of the lifting ribs 8. Preferably, the inner drum 1 is a tapered drum in which the diameter of the end with the inner drum bottom 102 is greater than the diameter of the end with the inner drum opening 101. The lifting ribs 8 extend to one end of the inner drum bottom 102, so that the end portions of the hollow portions inside the lifting ribs 8 are directly constituted by the inner drum bottom 102. Furthermore, the drainage ports 10 communicating with the hollow portions of the lifting ribs 8 are formed in the corresponding positions of the inner drum bottom 102.

In the present embodiment, the lifting ribs 8 are hollow inside, and a circle of gap is formed in a joint of the bottom portion of each lifting rib 8 and the side wall of the inner drum 1, and the gap constitutes a water flow passage enabling the hollow portion inside the lifting rib 8 to communicate with the interior of the inner drum 1, so that the water flow in the inner drum 1 flows into the hollow portions of the lifting ribs 8 through the gaps.

In the present embodiment, as shown in FIG. 16, when the washing machine is in a dewatering state, the inner drum 1 is in a high-speed rotation state, and the water in the inner drum 1 flows on the inner wall under the action of the centrifugal force, flows into the lifting ribs 8 from the gaps between the wall of the inner drum 1 and the lifting ribs 8, and then is gathered and flows towards the large-opening end of the inner drum 1 along the wall of the inner drum 1. At this time, the balancing weights 91 move towards the periphery of the inner drum 1 under the action of the centrifugal force and provide a pulling force that is towards the middle portion direction of the inner drum 1 to the valve bodies 92 through the supporting rods. The centrifugal force of the balancing weights 91 on the valve bodies 92 counteracts the elastic force of the springs 911, so that the valve bodies 92 move along the axial direction of the inner drum 1 and open the drainage ports 10. As shown in FIG. 15, when the washing machine is not in a dewatering state, the inner drum 1 is not in the high-speed rotation state, and the balancing weights 91 are no longer stressed by the centrifugal force. The springs 911 are in a pulled state and apply a pushing force that is towards the direction of the inner drum bottom 102 to the valve bodies 92, so that the valve bodies 92 move towards the initial positions until the drainage ports 10 are closed. In addition, when the inner drum 1 is in a washing or rinsing program, the springs 911 keep providing the elastic force to the valve bodies 92 to ensure that the valve bodies 92 block the drainage ports 10 all the time, and then ensure that the drainage ports 10 in the inner drum bottom 102 are in the closed state all the time.

Embodiment VI

Figure 17:
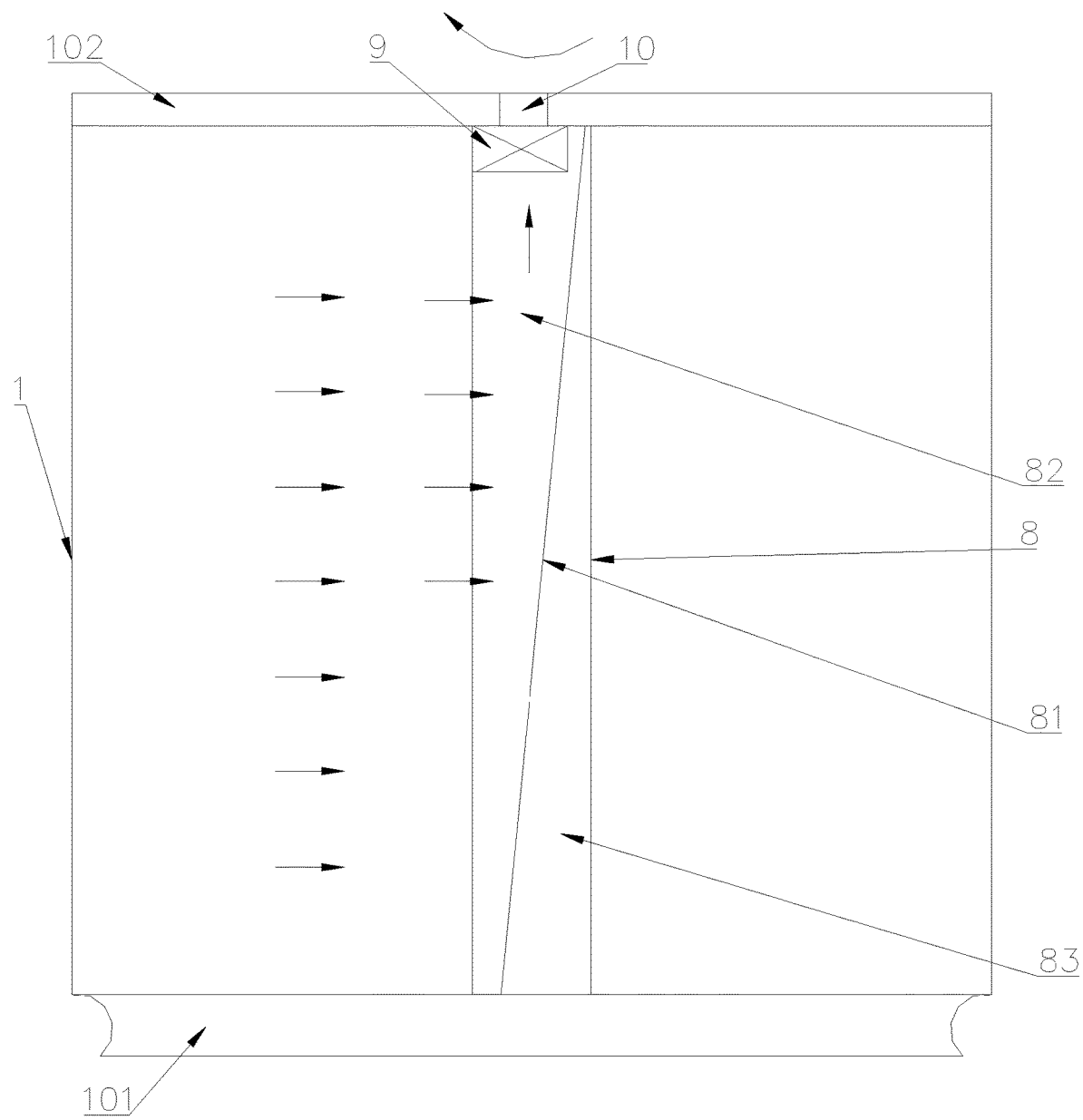
FIG. 17 is a sectional structural schematic diagram of an inner drum of a washing machine in Embodiment VI of the present disclosure.

In the embodiment of the present disclosure, in order to discharge a water flow separated from clothes in an inner drum of a washing machine and realize that the inner drum 1 is sealed to hold water for normal washing during working of the washing machine, on the basis of the above embodiments III to V, the following settings are carried out to enable the water in the inner drum 1 to successfully flow into the hollow portions of lifting ribs 8 and be discharged through drainage ports 10 formed the hollow portions of the lifting ribs 8:

As shown in FIG. 17, the present embodiment discloses the lifting ribs 8 of the inner drum 1 for the washing machine. The lifting ribs 8 are hollow inside. A plurality of through holes are formed in the lifting ribs 8 to enable the hollow portions of the lifting ribs 8 to communicate with the interior of the inner drum 1. The hollow portions of the lifting ribs 8 are provided with baffle plates 81 extending from the opening end of the inner drum 1 to an inner drum bottom 102. Each baffle plate 81 divides the hollow portion of the corresponding lifting rib 8 into two mutually independent portions.

Through the arrangement of the division baffle plates in the hollow portions of the lifting ribs of the inner drum, after the washing water in the inner drum flows into the hollow portions of the lifting ribs, it is stopped by the baffle plates and retained in the lifting ribs. The retained water in the hollow portions of the lifting ribs flows along the baffle plates to the drainage ports formed in the hollow portions of the lifting ribs, and sealing valves are opened during the high-speed rotation of the inner drum for dewatering to discharge the water flow from the drainage ports, thus achieving the objectives of forming the drainage port in the hollow portions of the lifting ribs of the inner drum and successfully discharging the water flow in the inner drum to the outside.

In the present embodiment, the baffle plates 81 and the structural line of the side wall of the inner drum 1 are inclined at a certain angle in a staggered manner, so that when the inner drum 1 rotates, the inclined baffle plates 81 guides the water flow to flow along the baffle plates, and the retained water in the hollow portions of the lifting ribs 8 flows along the baffle plates 81 to the drainage ports 10, and is successfully discharged to the outside.

In the present embodiment, the plurality of through holes are formed in the side wall of each lifting rib 8, and the through holes are each divided into two parts respectively communicating with two independent cavities, divided by the corresponding baffle plate 81, of the hollow portion of the corresponding lifting rib 8, so that the retained water in the inner drum 1 can successfully flow into the lifting ribs 8 through the through holes. Preferably, certain gaps are reserved between the lifting ribs 8 and the side wall of the inner drum 1, so that the retained water flowing on the wall of the inner drum 1 successfully flows into the lifting ribs 8 of the inner drum 1 through the gaps.

In the present embodiment, the inner drum 1 of the washing machine is a tapered drum in which the end with the inner drum bottom 102 and the end with an inner drum opening 101 are not equal in size. The plurality of lifting ribs 8 are arranged on the side wall of the inner drum 1. The lifting ribs 8 all extend from the drum opening of the inner drum 1 to the inner drum bottom 102. The large-opening end of the inner drum 1 is provided with the drainage ports 10 communicated with internal spaces of the lifting ribs 8. The sealing valves 9 located inside the lifting ribs 8 are arranged at the drainage ports 10. During the high-speed rotation of the inner drum 1, valve bodies 92 of the sealing valves 9 move along the axial direction of the inner drum 1 towards the middle portion direction of the inner drum 1 under the action of the centrifugal force, so as to open the drainage ports 10 formed in the end portion of the inner drum 1. Preferably, the diameter of the inner drum bottom 102 is greater than the diameter of the drum opening end, so that the drainage ports 10 are formed in the inner drum bottom 102 and are uniformly distributed along the periphery of the inner drum bottom 102.

In the present embodiment, first cavities 82 of the hollow portions inside the lifting ribs 8 correspondingly communicate with the drainage ports 10 formed in the large-opening end of the inner drum 1. Second cavities 83 of the hollow portions inside the lifting ribs 8 are isolated from the drainage ports 10 formed in the large-opening end of the inner drum 1 by the baffle plates, so that the drainage ports 10 are formed in the large cross sections of the first cavities 82, and the retained water inside the lifting ribs 8 flow along the baffle plates towards the large cross section ends of the first cavities 82, and is successfully discharged to the outside from the drainage ports 10 in the large cross section ends of the first cavities 82, thus achieving the objective of improving the drainage smoothness.

In the present embodiment, during dewatering of the washing machine, the inner drum 1 rotates to the same direction at a high speed. The first cavities 81 of the hollow portions of the lifting ribs 8 are disposed in the side of the rotating direction of the inner drum 1 during the dewatering of the washing machine relative to the second cavities 83, so that when the washing machine is in a dewatering program, the inner drum 1 rotates in a single direction, and the sides with the first cavities 82 of the lifting ribs 8 of the inner drum are water-repellent surfaces which are in contact with the water flow at the lower portion of the inner drum. Therefore, the water flow in the inner drum 1 flows into the first cavities 82 along with the unidirectional rotation of the inner drum 1, and then is discharged through the drainage ports 10 in the end portions of the first cavities 82.

In the present embodiment, each first cavity 82 is a tapered cavity in which the cross section of one end is larger than the cross section of the other end. The relatively large cross section ends of the first cavities 82 are arranged at the large-opening end of the inner drum 1, and the drainage ports 10 formed in the end portion of the inner drum 1 communicate with the relatively large cross section ends of the first cavities 82.

In the present embodiment, the plurality of through holes are formed in joints of the lifting ribs 8 and the large-opening end of the inner drum 1. At least partial through holes formed in the joints communicate with the first cavities 82 of the hollow portions of the lifting ribs 8, so as to guide the retained water at the large-opening end of the inner drum 1 to flow into the hollow portions of the lifting ribs 8 through the through holes, and the water flow in the inner drum 1 is successfully discharged to the outside.

The present embodiment further discloses the washing machine. The inner drum 1 of the washing machine is an enclosed container after the inner drum opening 101 is fastened by a door cover 4. The inner drum 1 is a tapered drum in which the end with the inner drum bottom 102 and the end with the inner drum opening 101 are not equal in size. The plurality of the above-mentioned lifting ribs 8 are arranged on the side wall of the inner drum 1.

In the present embodiment, the diameter of the end with the inner drum bottom 102 is greater than the diameter of the end with the inner drum opening 101. The drainage ports 10 communicating with the lifting ribs 8 in a one-to-one correspondence manner are formed in the inner drum bottom 102. The sealing valves 9 located inside the lifting ribs 8 are respectively arranged at the drainage ports 10. During the high-speed rotation of the inner drum 1, the valve bodies 92 of the sealing valves 9 move along the axial direction of the inner drum 1 towards the middle portion direction of the inner drum 1 under the action of the centrifugal force, so as to open the drainage ports 10 formed in the end portion of the inner drum 1.

Embodiment VII

Figure 18:
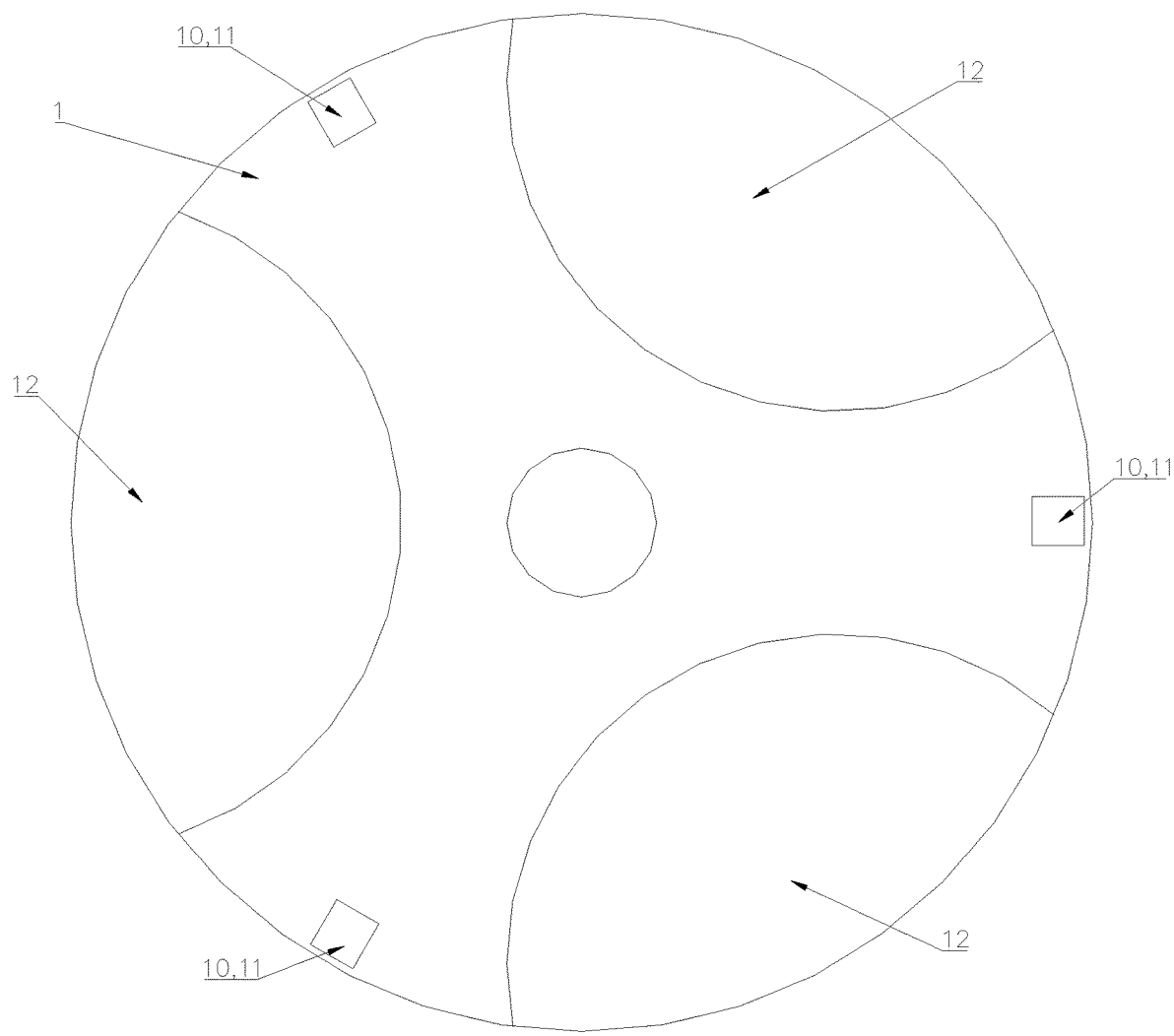
FIG. 18 is a rear-view structural schematic diagram of an inner drum of a washing machine in Embodiment VII of the present disclosure.

In the embodiment of the present disclosure, in order to discharge a water flow separated from clothes in an inner drum 1 of a washing machine and realize that the inner drum 1 is sealed to hold water for normal washing during working of the washing machine, the following settings are carried out:

As shown in FIG. 18, the present embodiment discloses the washing machine. The inner drum 1 of the washing machine is an enclosed container after an inner drum opening 101 is fastened by a door cover 4. A plurality of drainage ports 10 are formed in the periphery of the inner drum 1. Control valves for controlling the drainage ports 10 to be correspondingly opened and closed are respectively arranged at the various drainage ports 10. The various control valves 11 are in matched connection with a control circuit board of the washing machine, so that when the washing machine executes a high-speed dewatering program, the control valves are opened to discharge the water in the inner drum 1 to the outside from the various drainage ports 10.

Through the arrangement of the control valves controlled to be opened and closed at the drainage ports 10 of the inner drum 1 of the washing machine, the control valves are automatically controlled to be opened when the washing machine executes the dewatering program, and are automatically controlled to be closed when the washing machine executes a non-dewatering program, thus achieving the objective that the washing machine automatically controls the drainage ports 10 to be opened and closed.

In the present embodiment, the inner drum 1 of the washing machine is a tapered drum in which the end with the drum opening and the end with an inner drum bottom 102 have unequal diameters. The drainage ports 10 of the inner drum 1 of the washing machine are formed in the large-opening end of the inner drum 1. Preferably, the diameter of the inner drum bottom 102 of the inner drum 1 of the washing machine is greater than the diameter of the opening end of the inner drum 1. The plurality of drainage ports 10 are uniformly distributed at the periphery of the inner drum bottom 102.

In the present embodiment, the plurality of drainage ports 10 are formed in the periphery of the inner drum bottom 102, and the drainage ports are symmetrically disposed relative to the axial line of the inner drum 1. The drainage ports 10 are correspondingly provided with the control valves, respectively.

In the present embodiment, the various control valves 11 are linked, so that after the washing machine sends a corresponding instruction, the various control valves 11 simultaneously execute an opening or closing action, and achieving the objective of simultaneous linkage control over the various drainage ports 10 formed in the inner drum 1 of the washing machine to synchronously execute the opening or closing action, and an effect that the various control valves of the inner drum 1 of the washing machine synchronously work to make the water flow in the inner drum 1 be successfully discharged to the outside is achieved.

In the present embodiment, the control valves 11 arranged at the drainage ports 10 of the inner drum 1 of the washing machine are controlled by electromagnetic driving. Electromagnetic valve bodies 92 are arranged at the drainage ports 10 of the inner drum 1. Corresponding magnetic driving devices for controlling the electromagnetic valve bodies 92 to be opened and closed are mounted on a housing 2 of the washing machine, so that when the magnetic driving devices are powered on to work, the electromagnetic valve bodies 92 are controlled to be opened; and when the magnetic driving devices do not work, the electromagnetic valve bodies 92 are automatically closed. Since the control valves of the washing machine are set to be controlled by electromagnetic driving, the inner drum 1 is controlled during the rotation, and is in no interference contact with the housing 2 of the washing machine, thus achieving the objective that the inner drum 1 of the washing machine rotates freely and works without interference.

In the present embodiment, the control valves 11 arranged at the drainage ports 10 of the inner drum 1 of the washing machine are controlled by wireless power supply. The electric control valve bodies 92 are arranged at the drainage ports 10 of the inner drum 1. Corresponding wireless power supply devices for controlling the electric control valve bodies 92 to be opened and closed are mounted on the housing 2 of the washing machine, so that when the wireless power supply devices are powered on to work, the electric control valve bodies 92 are controlled to be opened; and when the wireless power supply devices do not work, the electric control valve bodies 92 are automatically closed. Since the control valves of the washing machine are set to be controlled by wireless power supply, the inner drum 1 is controlled during the rotation, and is in no interference contact with the housing 2 of the washing machine, and thus achieving the objective that the inner drum 1 of the washing machine rotates freely and works without interference.

In the present embodiment, the inner drum bottom 102 is provided with a plurality of convex ribs 12 extending from the center towards the periphery. The various convex ribs 12 are symmetrically disposed relative to the center of the inner drum bottom 102. The drainage ports 10 are formed between adjacent convex ribs 12. The drainage ports 10 are formed in the periphery of the inner drum bottom 102 and have equal spacings from the convex ribs 12 on both sides.

The present embodiment further discloses a control method of any one of the above-mentioned washing machine. When the washing machine executes the dewatering program, the inner drum 1 rotates at the high speed, and the control valves 11 at the various drainage ports 10 at the periphery of the inner drum 1 are opened, so that the washing water in the inner drum 1 flows towards the wall of the inner drum 1 under the action of the centrifugal force, and flows out from the drainage ports 10 formed in the inner drum 1.

Through the above method, the control valves capable of controlling opening and closing are arranged at the drainage ports of the inner drum of the washing machine, so that the control valves are automatically controlled to be opened when the washing machine executes the dewatering program, and are automatically controlled to be closed when the washing machine executes the non-dewatering program, thus achieving the objective that the washing machine automatically controls the drainage ports 10 to be opened and closed when executing the dewatering program.

In the present embodiment, when the washing machine normally executes the washing program and the rinsing program, the control valves 11 arranged at the drainage ports 10 at the periphery of the inner drum 1 are closed, so that the clothes and the washing water in the inner drum 1 are sealed in the inner drum 1, and the clothes are beaten and washed under the acting force of the rotation of the inner drum 1.

In the present embodiment, when the washing machine executes the dewatering program, the inner drum 1 rotates at the high speed, so that the washing water in the inner drum 1 flows on the wall of the inner drum 1 under the action of the centrifugal force and is limited by the wall of the tapered inner drum 1. Therefore, the washing water flowing on the wall of the inner drum 1 flows to the large-opening end of the inner drum and flows out from the drainage ports 10 which are formed in the periphery of the large-opening end of the inner drum 1 and have the control valves 11 in the opened state.

In conclusion, in the present embodiment, the control method of the washing machine specifically includes the following steps:

Step 1: the washing machine starts to work;

Step 2: the control valves are in the closed state, the washing water being fed into the inner drum of the washing machine, and the inner drum of the washing machine rotating to execute the washing program;

Step 3: after the washing program is finished, the control valves being opened, and the washing water in the inner drum flowing out from the drainage ports;

Step 4: after drainage is finished, the control valves being closed again;

Step 5: the control valves are in the closed state, rinsing water being fed into the inner drum of the washing machine, and the inner drum of the washing machine rotating to execute the rinsing program;

Step 6: after the rinsing program is finished, the control valves being opened, and the rinsing water in the inner drum flowing out from the drainage ports;

Step 7: after drainage is finished, the control valves keeping opened;

Step 8: the control valves are in the opened state, the inner drum of the washing machine rotating at the high speed to execute the dewatering program, and the water separated from the clothes flowing out from the drainage ports.

Through the above steps, the control valves controlled to be opened and closed are arranged at the drainage ports of the inner drum of the washing machine, so that during working, the washing machine automatically controls the control valves to be correspondingly opened and closed to achieve the objective of storing the water for washing or rinsing in the inner drum and discharging the water for dewatering.

The above descriptions are only preferred embodiments of the present disclosure, but not intended to limit the present disclosure in any forms. Although the present disclosure is disclosed above by the preferred embodiments, the preferred embodiments are not intended to limit the present disclosure. Any person skilled in the art can make some changes by using the above-mentioned technical contents or modify the technical contents as equivalent embodiments of equivalent changes without departing from the scope of the technical solution of the present disclosure. Any simple alterations, equivalent changes and modifications that are made to the above embodiments according to the technical essence of the present disclosure without departing from the contents of the technical solution of the present disclosure shall all fall within the scope of the solution of the present disclosure.

The invention claimed is:

1. A washing machine comprising an inner drum, wherein:
the inner drum of the washing machine is an enclosed container after an opening is fastened by a door cover; a plurality of lifting ribs is arranged on a side wall of the inner drum; a hollow portion is arranged in each of the lifting ribs and communicates with an interior of the inner drum;
a drainage port communicating with the hollow portion of each of the lifting ribs is formed in the side wall of the inner drum;
a sealing valve located inside each of the lifting ribs is arranged at the drainage port, the sealing valve comprising a valve body and a balancing weight; the valve body and the balancing weight being fixedly connected with two ends of a supporting rod, respectively; a middle portion of the supporting rod being in contact with the inner drum; and
during a high-speed rotation of the inner drum, a valve body of the sealing valve moves along a radial direction to a center of the inner drum under an action of a centrifugal force, to open the drainage port formed in the side wall of the inner drum, and the balancing weight moves up and down along the radial direction of the inner drum under the action of the centrifugal force, and the valve body is lifted by the supporting rod to generate a displacement opposite to a motion direction of the balancing weight along the radial direction of the inner drum.

2. The washing machine according to claim 1, wherein: a circle of gap is formed between a bottom portion of each of the lifting ribs and the side wall of the inner drum, and the gap constitutes a water flow passage enabling the hollow portion of each of the lifting ribs to communicate with the interior of the inner drum.

3. The washing machine according to claim 1, wherein: the drainage port is formed in a position, corresponding to the hollow portion of each of the lifting ribs, of the side wall of the inner drum and enables the hollow portion of each of the lifting ribs to communicate with outside, so as to discharge washing water flowing into the hollow portion of each of the lifting ribs through the drainage port.

4. The washing machine according to claim 1, wherein: the supporting rod comprises a first rod portion and a second rod portion which are arranged in a staggered manner; a joint of the first rod portion and the second rod portion is lower than both an end portion of the first rod portion and an end portion of the second rod portion, and the joint of the first rod portion and the second rod portion is in contact with the inner drum, so that the valve body and the balancing weight at the two ends of the supporting rod rotatably move up and down around the joint.

5. The washing machine according to claim 4, wherein: the end portion of the first rod portion is hinged with the valve body, and the end portion of the second rod portion is fixedly connected with the balancing weight; and
an axial length of the first rod portion is less than an axial length of the second rod portion.

6. The washing machine according to claim 3, wherein: the hollow portion of each of the lifting ribs is provided with a mounting seat fixed to the side wall of the inner drum; the valve body of the sealing valve is mounted on the mounting seat and is movable along the radial direction of the inner drum; a first end of the valve body penetrates out of the mounting seat and is connected with an end portion of the supporting rod, and a second end of the valve body is arranged corresponding to the drainage port formed in the side wall of the inner drum.

7. The washing machine according to claim 6, wherein: the mounting seat is a tapered body arranged correspondingly coaxial with the drainage port; the tapered body is hollow inside to mount the valve body; the first end of the valve body penetrates a top portion of the tapered body and is hinged with the supporting rod, and the second end of the valve body is provided with a plug for correspondingly sealing the drainage port.

8. The washing machine according to claim 1, wherein: the valve body of the sealing valve and/or the supporting rod are connected with the inner drum through an elastic recovery member, so that an elastic force is applied to the valve body and pushes the valve body to close the drainage port, and the centrifugal force counteracts the elastic force of the elastic recovery member during the high-speed rotation of the inner drum to enable the valve body to move to open the drainage port.

9. The washing machine according to claim 8, wherein: the lifting ribs extend along an axial direction of the inner drum; each of front and rear ends of the hollow portion of each of the lifting ribs is provided with at least one drainage port; the sealing valve is correspondingly mounted at each drainage port; and the balancing weights of sealing valves are both deviated towards a center direction of the inner drum relative to the drainage ports.

10. The washing machine according to claim 4, wherein: the valve body of the sealing valve and/or the supporting rod are connected with the inner drum through an elastic recovery member, so that an elastic force is applied to the valve body and pushes the valve body to close the drainage port, and the centrifugal force counteracts the elastic force of the elastic recovery member during the high-speed rotation of the inner drum to enable the valve body to move to open the drainage port.

11. The washing machine according to claim 5, wherein: the valve body of the sealing valve and/or the supporting rod are connected with the inner drum through an elastic recovery member, so that an elastic force is applied to the valve body and pushes the valve body to close the drainage port, and the centrifugal force counteracts the elastic force of the elastic recovery member during the high-speed rotation of the inner drum to enable the valve body to move to open the drainage port.

12. The washing machine according to claim 7, wherein: a diameter of an opening of the top portion of the tapered body is less than a diameter of a periphery of the plug, to avoid the plug from falling off from the mounting seat.

13. The washing machine according to claim 7, wherein: a joint of the supporting rod and the top portion of the tapered body is a limiting contact point, so that the joint of the supporting rod and the top portion of the tapered body is used as a supporting point to enable the balancing weight at the end portion of the supporting rod to move up and down around the supporting point.

14. The washing machine according to claim 8, wherein: the elastic recovery member is a spring; the spring is arranged on the periphery of the valve body and extends along the radial direction of the inner drum; and two ends of the spring are respectively in limiting contact with the plug of the valve body and a top end of a mounting seat, the spring is clamped between the valve body and the mounting seat.

* * * * *